United States Patent [19]
Satoh et al.

[11] Patent Number: 6,142,367
[45] Date of Patent: *Nov. 7, 2000

[54] ELECTRONIC DEVICE AND METHOD OF DISPLAYING MATHEMATICAL EXPRESSIONS INCLUDING VARIABLES

[75] Inventors: Akiyoshi Satoh, Nara; Toshiro Oba, Soraku-gun; Fumiaki Kawawaki, Shiki-gun, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,353

[22] Filed: Jun. 25, 1997

[30] Foreign Application Priority Data

Jul. 23, 1996 [JP] Japan .................................. 8-193657

[51] Int. Cl.$^7$ ...................................................... G06F 29/00
[52] U.S. Cl. .................................. 235/61 PL; 235/145 R; 708/168
[58] Field of Search ............................ 235/61 PL, 61 A, 235/61 R, 145 R, 1 D, 419; 708/168, 160, 174; 345/440

[56] References Cited

U.S. PATENT DOCUMENTS

| | | | |
|---|---|---|---|
| 3,955,074 | 5/1976 | Rode et al. ..................... | 235/145 R X |
| 4,810,860 | 3/1989 | Sekine ................................ | 235/145 R |
| 5,245,559 | 9/1993 | Lapeyre ................................ | 708/174 |
| 5,381,353 | 1/1995 | Oba ..................................... | 708/168 |
| 5,530,234 | 6/1996 | Loh et al. ............................. | 235/61 R |
| 5,557,718 | 9/1996 | Tsuneyoshi et al. ................. | 345/440 |
| 5,870,319 | 2/1999 | Thornton et al. .................... | 708/160 |

OTHER PUBLICATIONS

"Variable Replacement Processor", Japanese Laid–Open Patent Publication No. 6–119158; Published on Apr. 28, 1994.

*Primary Examiner*—Michael G Lee
*Assistant Examiner*—Jared J. Fureman
*Attorney, Agent, or Firm*—Dike, Bronstein, Roberts & Cushman, LLP; David G. Conlin

[57] ABSTRACT

The present invention is intended to enable an electronic calculator device for calculating functions to display a mathematical expression by automatically substituting a variable-value into a variable therein in advance. An electronic device comprises an input device for inputting a mathematical expression containing a variable, a store device for storing a value of the variable and a display device for displaying a mathematical expression on a display screen. The electronic device is further provided with a converting device for reading a value for a variable contained in a mathematical expression from the store device and substituting the read-out value into the variable in the mathematical expression to be displayed on the display screen.

4 Claims, 42 Drawing Sheets

FIG.1
(PRIOR ART)

```
sin A+cos B+CD/8+E
A=            30
B=            60
C=         1,2345
D=          1000
E=         45.987
Ans=      201.237
```

FIG.2
(PRIOR ART)

(a)
```
sin A+cos B+CD/8
A=            30
B=            60
```
ON A SMALL
DISPLAY SCREEN (b)
```
sin A+cos B+CD/8
E=         45.987
Ans=      201.237
```
SCROLLING A
PART OF VARIABLE (c)
```
n A+cos B+CD/8+E
E=         45.987
Ans=      201.237
```
SCROLLING A
PART OF MATHEMATICAL
EXPRESSION

BUFFER FOR STORING VARIABLE-VALUES

| VARIABLE-NAME | VARIABLE-VALUE |
|---|---|
| A | 30 |
| B | 60 |
| C | 1.2345 |
| D | 1000 |
| E | 0 |
| ~ | ~ |
| Ans | 0 |

FIG.6
14- BUFFER FOR STORING A MATHEMATICAL EXPRESSION
15- BUFFER FOR EXPANDING A MATHEMATICAL EXPRESSION
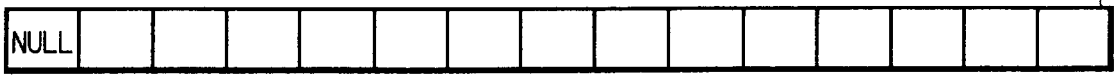
16- BUFFER FOR EXPANDING A VALUE
FIG.7
CHARACTER CONVERSION TABLE
| KEY | CHARACTER STRING |
|-----|------------------|
| A | 'A' |
| B | 'B' |
| C | 'C' |
| D | 'D' |
| E | 'E' |
| ~ | ~ |
| sin | 's''i''n' |
| cos | 'c''o''s' |
| tan | 't''a''n' |
| ~ | ~ |
| 0 | '0' |
| 1 | '1' |
| 2 | '2' |
| 3 | '3' |
| 4 | '4' |
| 5 | '5' |
| | |

FIG.9

(a) INITIAL STATE
BUFFER FOR STORING A MATHEMATICAL EXPRESSION
| NULL | | | | | | | | |

↑K   14

BUFFER FOR EXPANDING A MATHEMATICAL EXPRESSION
| NULL | | | | | | | | |

↑T   15

(b) AFTER INPUTTING FROM A sin KEY
BUFFER FOR STORING A MATHEMATICAL EXPRESSION
| sin | NULL | | | | | | | |

↑K   14

BUFFER FOR EXPANDING A MATHEMATICAL EXPRESSION
| s | i | n | NULL | | | | | |

↑T   15

(c) AFTER INPUTTING FROM AN A KEY
(c-1) VARIABLE-NAME DISPLAY MODE:
A VALUE DISPLAY FLAG IS UNSET (OFF)
BUFFER FOR STORING A MATHEMATICAL EXPRESSION
| sin | A | NULL | | | | | | |

↑K   14

BUFFER FOR EXPANDING A MATHEMATICAL EXPRESSION
| s | i | n | A | NULL | | | | |

↑T   15

(c-2) VARIABLE-VALUE DISPLAY MODE:
A VALUE DISPLAY FLAG IS SET (ON)
BUFFER FOR STORING A MATHEMATICAL EXPRESSION
| sin | A | NULL | | | | | | |

↑K   14

BUFFER FOR EXPANDING A MATHEMATICAL EXPRESSION
| s | i | n | 3 | 0 | NULL | | | |

↑T   15

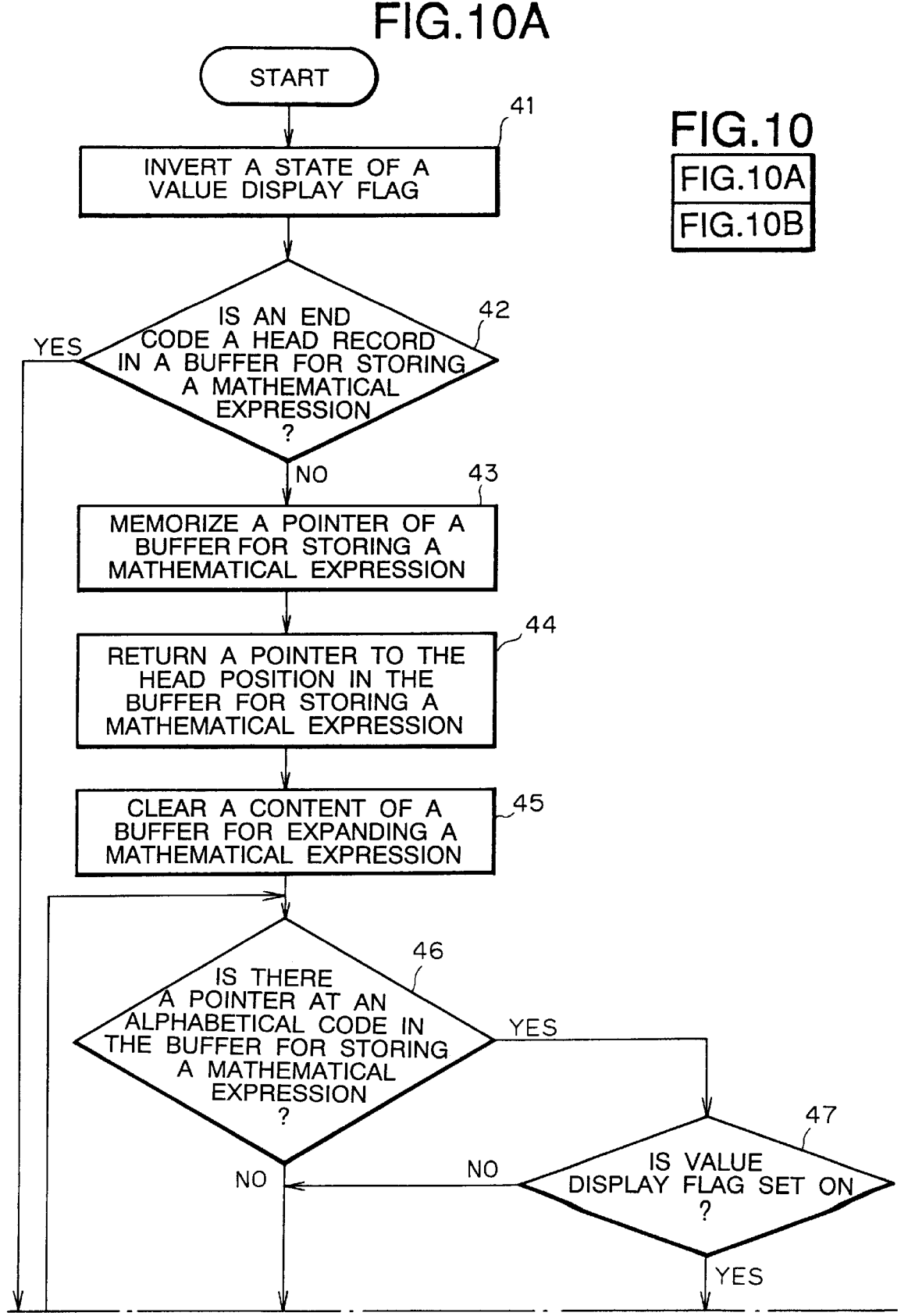

FIG.11

(a) JUST BEFORE INPUTTING A SIGNAL FROM A DISPLAY-
CHANGE KEY (WITH A VALUE DISPLAY FLAG BEING OFF):

BUFFER FOR STORING A MATHEMATICAL EXPRESSION: | sin | A | + | NULL | | | | | (14)

↑K

BUFFER FOR EXPANDING A MATHEMATICAL EXPRESSION: | s | i | n | A | + | NULL | | | (15)

↑T (b) WHEN INPUTTING A SIGNAL FROM A DISPLAY-CHANGE KEY:

BUFFER FOR STORING A MATHEMATICAL EXPRESSION: | sin | A | + | NULL | | | | | (14)

↑K

BUFFER FOR EXPANDING A MATHEMATICAL EXPRESSION: | NULL | | | | | | | | (15)

↑T (c) EXPANDING sin:

BUFFER FOR STORING A MATHEMATICAL EXPRESSION: | sin | A | + | NULL | | | | | (14)

↑K

BUFFER FOR EXPANDING A MATHEMATICAL EXPRESSION: | s | i | n | NULL | | | | | (15)

↑T (d) EXPANDING A:

BUFFER FOR STORING A MATHEMATICAL EXPRESSION: | sin | A | + | NULL | | | | | (14)

↑K

BUFFER FOR EXPANDING A MATHEMATICAL EXPRESSION: | s | i | n | 3 | 0 | NULL | | | (15)

↑T (e) EXPANDING + (END OF THE EXPANDING A MATHEMATICAL EXPRESSION):

BUFFER FOR STORING A MATHEMATICAL EXPRESSION: | sin | A | + | NULL | | | | | (14)

↑K

BUFFER FOR EXPANDING A MATHEMATICAL EXPRESSION: | s | i | n | 3 | 0 | + | NULL | | (15)

↑T (f) RETURNING POINTERS INTO INITIAL POSITIONS:

BUFFER FOR STORING A MATHEMATICAL EXPRESSION: | sin | A | + | NULL | | | | | (14)

↑K

BUFFER FOR EXPANDING A MATHEMATICAL EXPRESSION: | s | i | n | 3 | 0 | + | NULL | | (15)

↑T

AN EXAMPLE OF MOVING A CURSOR BY USING A CURSOR SHIFTING KEY (◀▶):

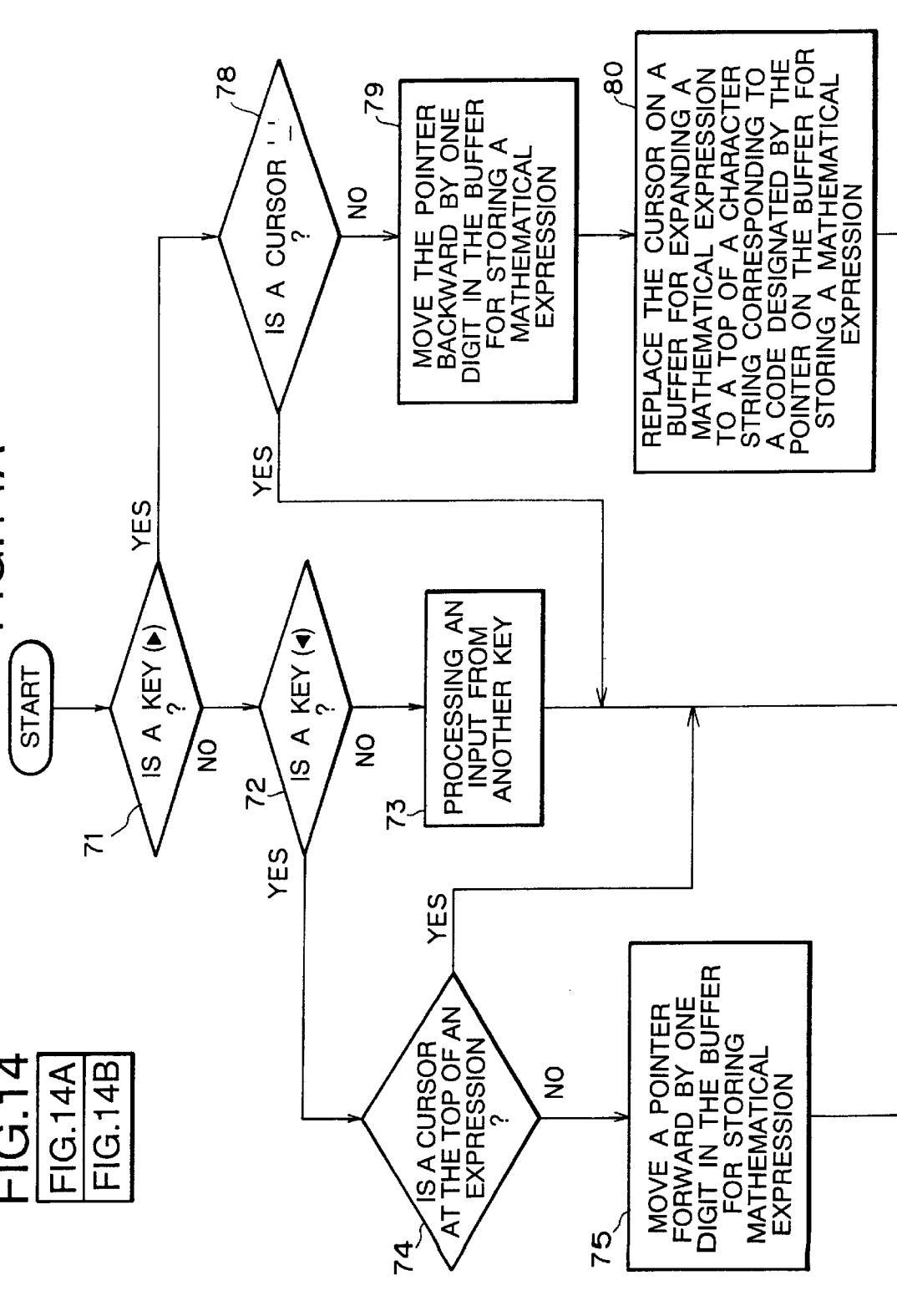

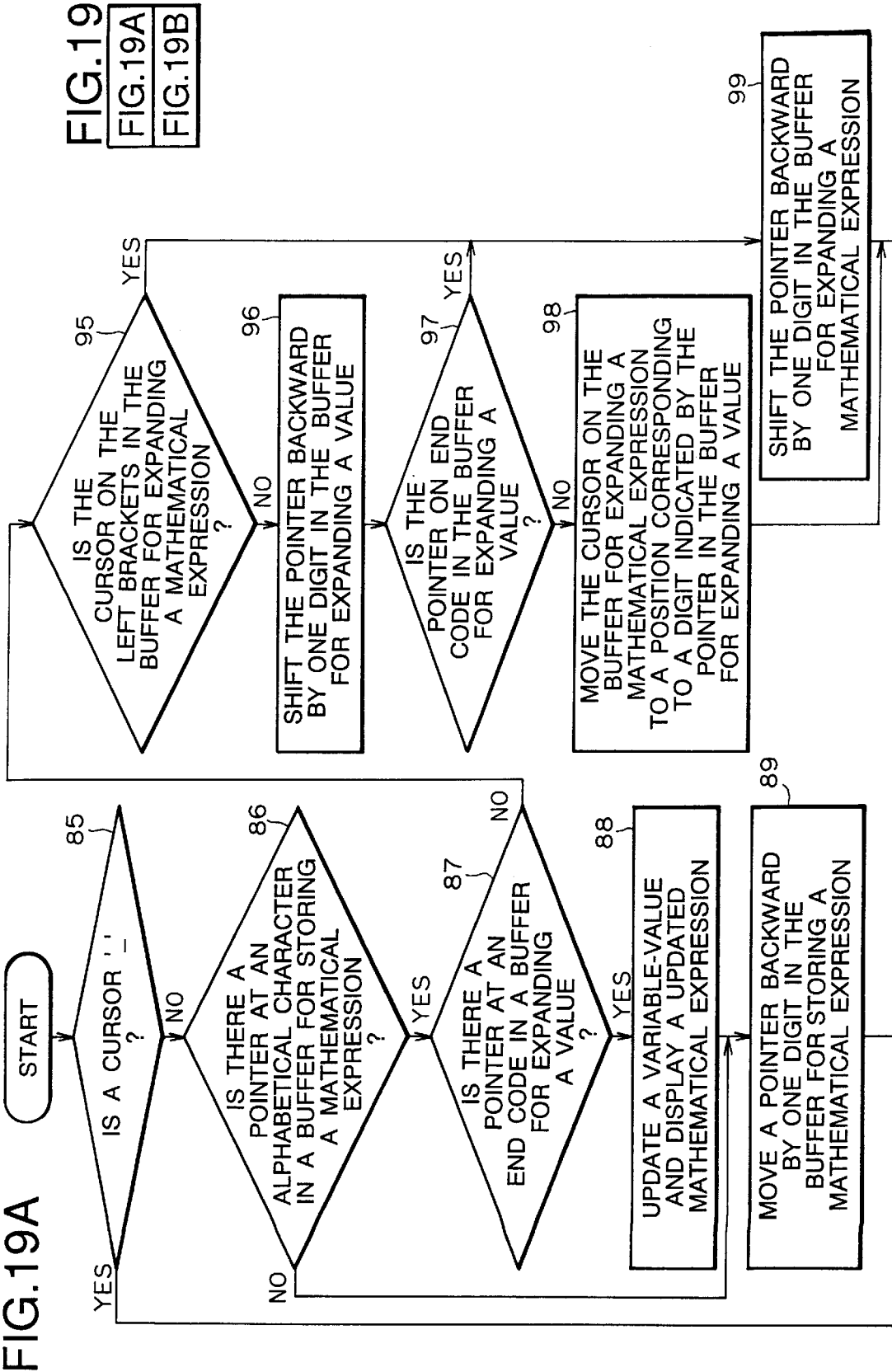

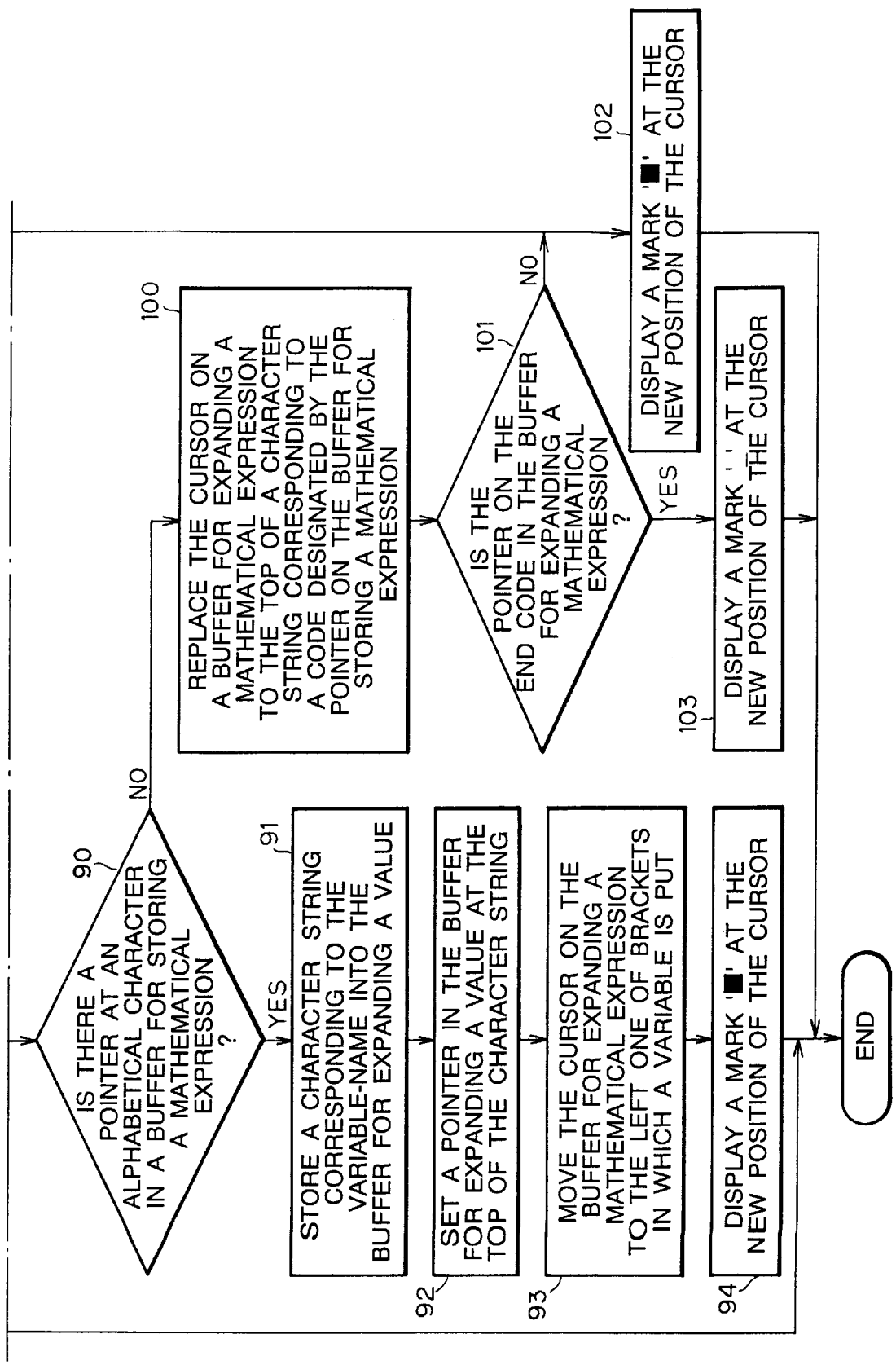

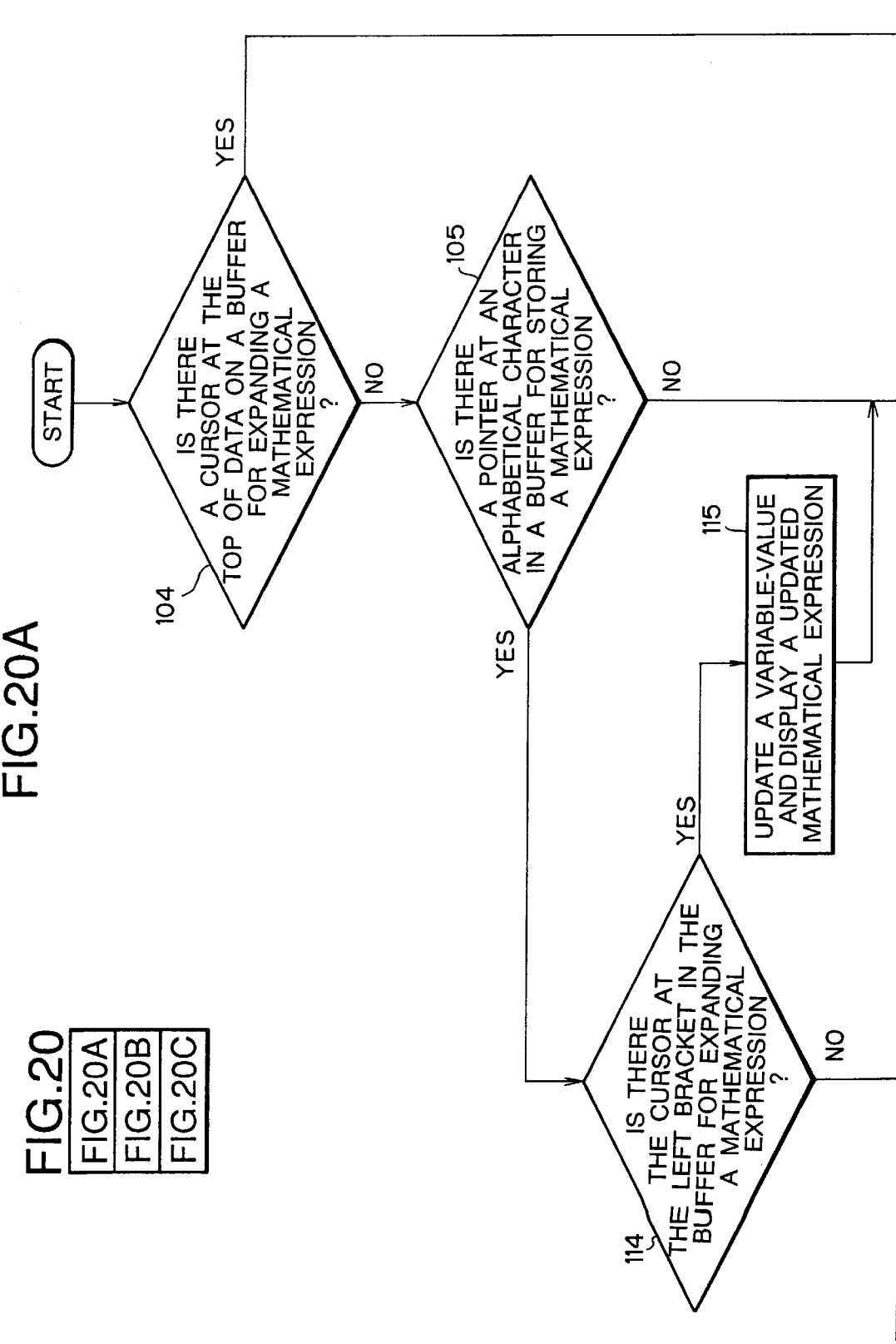

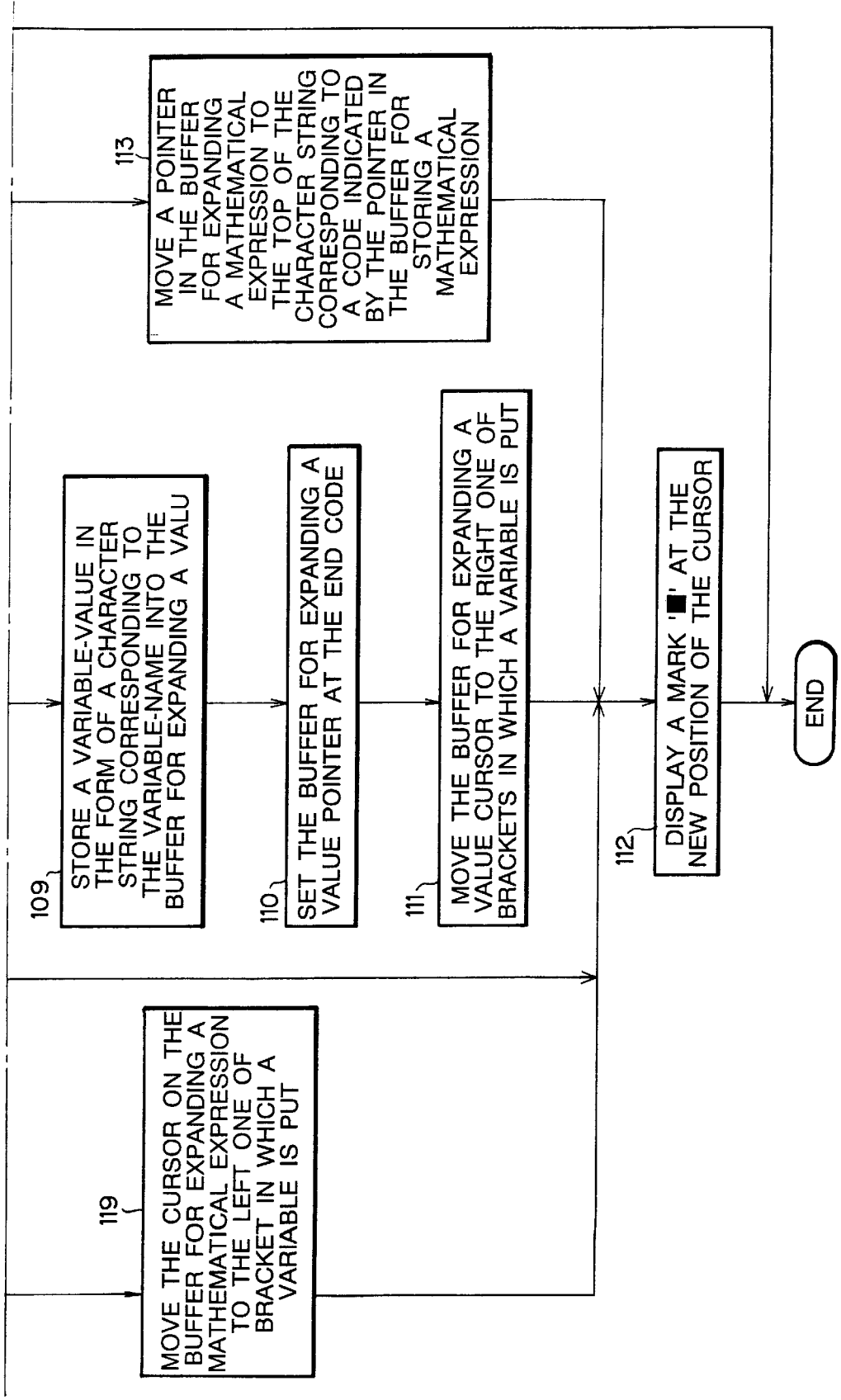

FIG.22
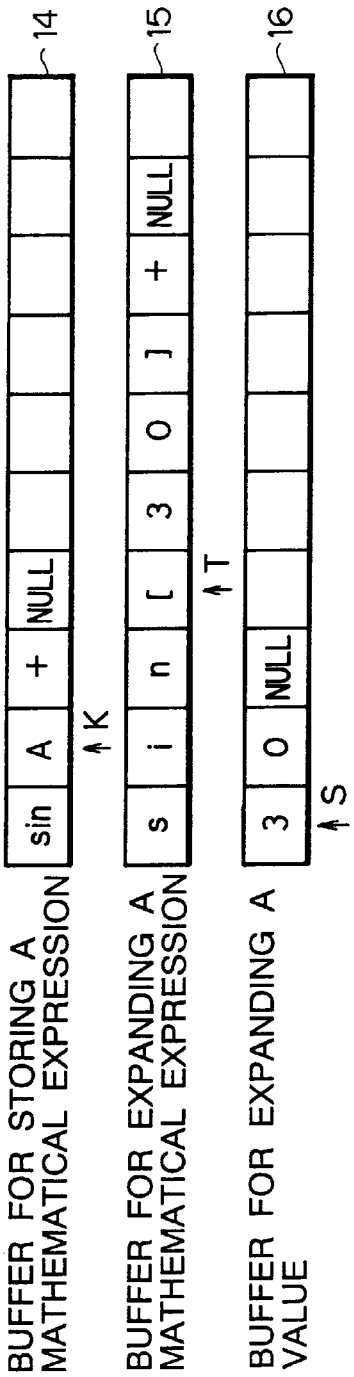
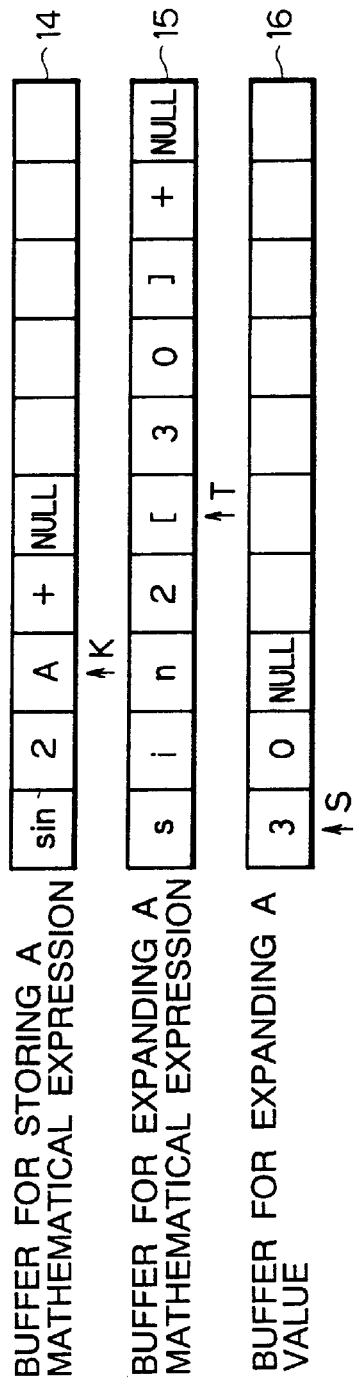

FIG.23

(a) PUT A CURSOR ON 0

`s i n [ 3 ⊙ ] +`

| sin | A | + | NULL | | | |
|---|---|---|---|---|---|---|
↑K

BUFFER FOR STORING A MATHEMATICAL EXPRESSION — 14

| s | i | n | [ | 3 | 0 | ] | + | NULL |
↑T

BUFFER FOR EXPANDING A MATHEMATICAL EXPRESSION — 15

| 3 | 0 | NULL |
↑S

BUFFER FOR EXPANDING A VALUE — 16

(b) INSERT 6

`s i n [ 3 6 ⊙ ] +`

| sin | A | + | NULL |
↑K

BUFFER FOR STORING A MATHEMATICAL EXPRESSION — 14

| s | i | n | [ | 3 | 6 | 0 | ] | + | NULL |
↑T

BUFFER FOR EXPANDING A MATHEMATICAL EXPRESSION — 15

| 3 | 6 | 0 | NULL |
↑S

BUFFER FOR EXPANDING A VALUE — 16

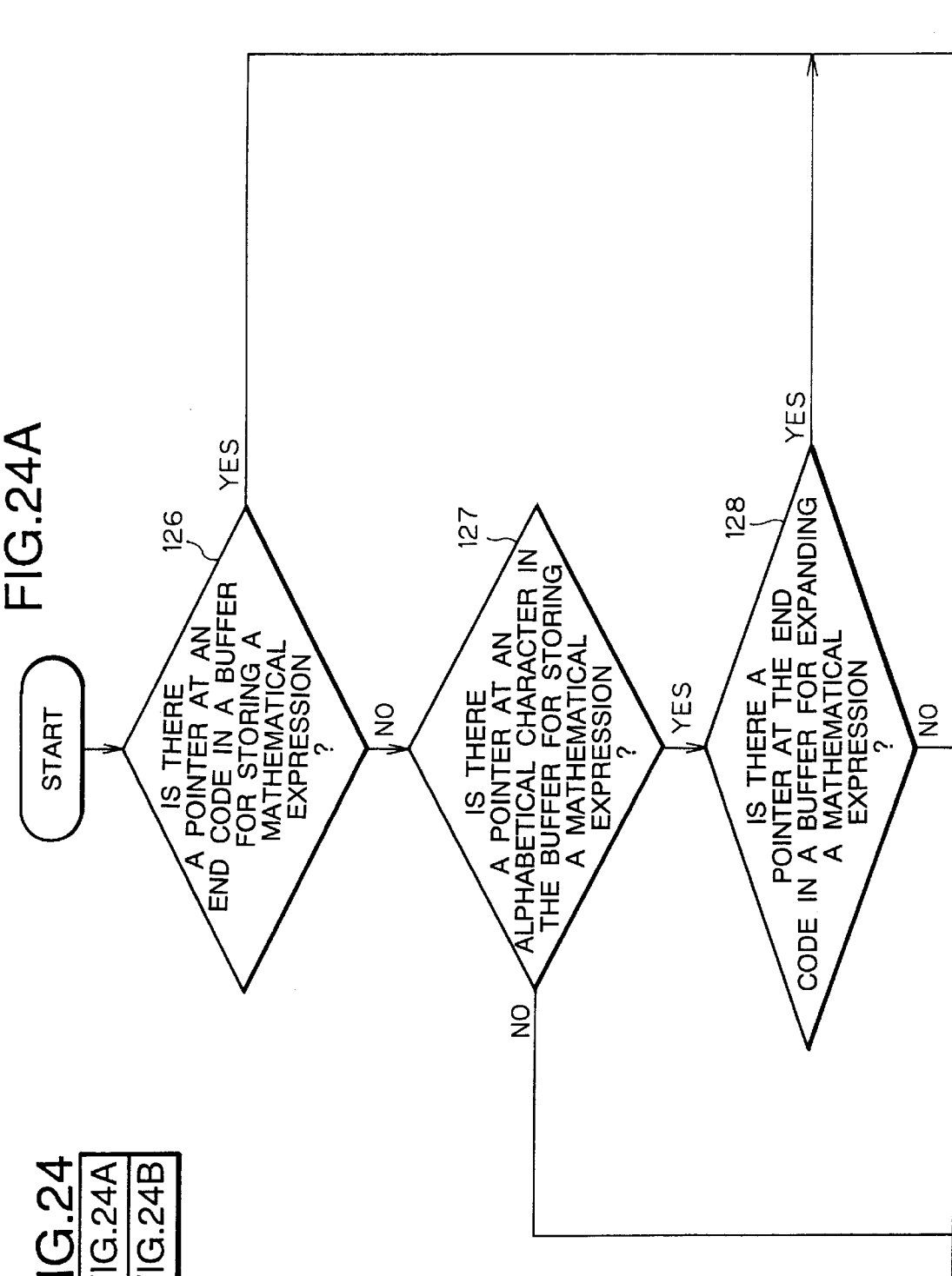

FIG.25

(a) PUT A CURSOR ON 3

| s | i | n | [ | 3 | 6 | 0 | ] | + | | 6 |

| sin | A | + | NULL | | | | 14
BUFFER FOR STORING A MATHEMATICAL EXPRESSION
↑K

| s | i | n | [ | 3 | 6 | 0 | ] | + | NULL | 15
BUFFER FOR EXPANDING A MATHEMATICAL EXPRESSION
↑T

| 3 | 6 | 0 | NULL | | | | 16
BUFFER FOR EXPANDING A VALUE
↑S (b) DELETE 3

| s | i | n | 2 | [ | 0 | ] | + | | | 6 |

| sin | A | + | NULL | | | | 14
BUFFER FOR STORING A MATHEMATICAL EXPRESSION
↑K

| s | i | n | [ | 6 | 0 | ] | + | NULL | | 15
BUFFER FOR EXPANDING A MATHEMATICAL EXPRESSION
↑T

| 6 | 0 | NULL | | | | | 16
BUFFER FOR EXPANDING A VALUE
↑S

FIG.29
(a) PUT A CURSOR ON 3
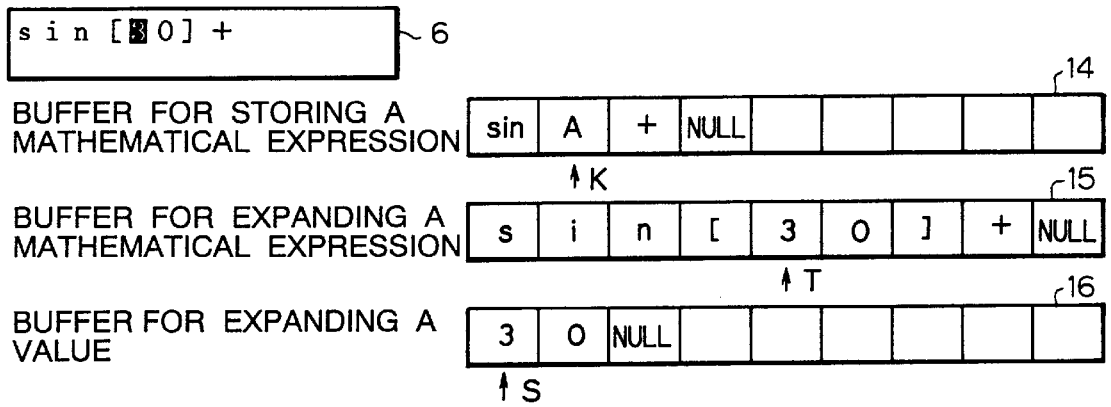
(b) ENTER AN INPUT FROM A CLEAR (CL) KEY
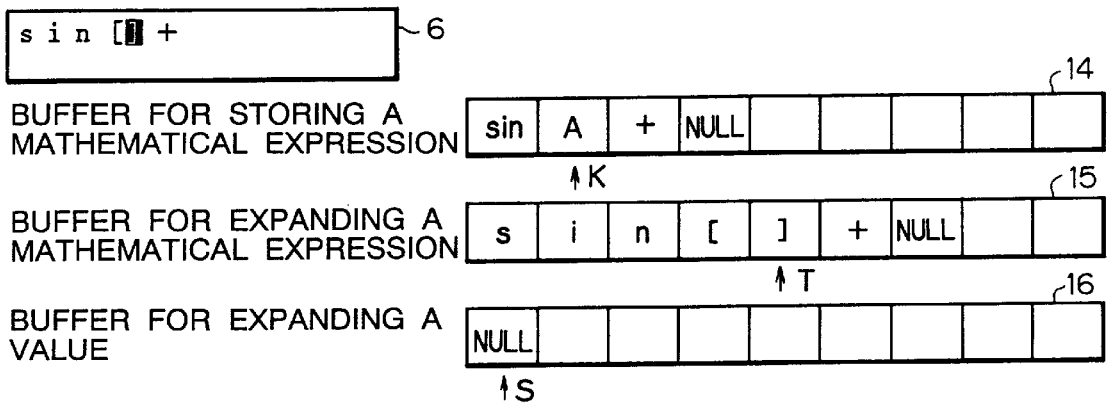
FIG.30
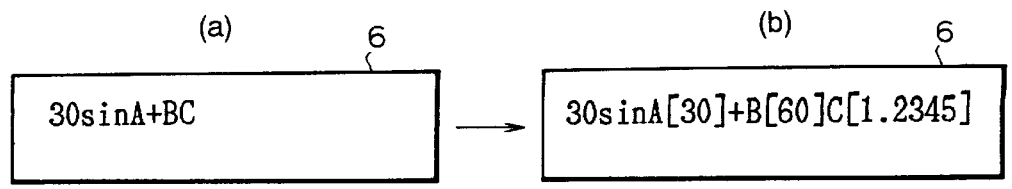

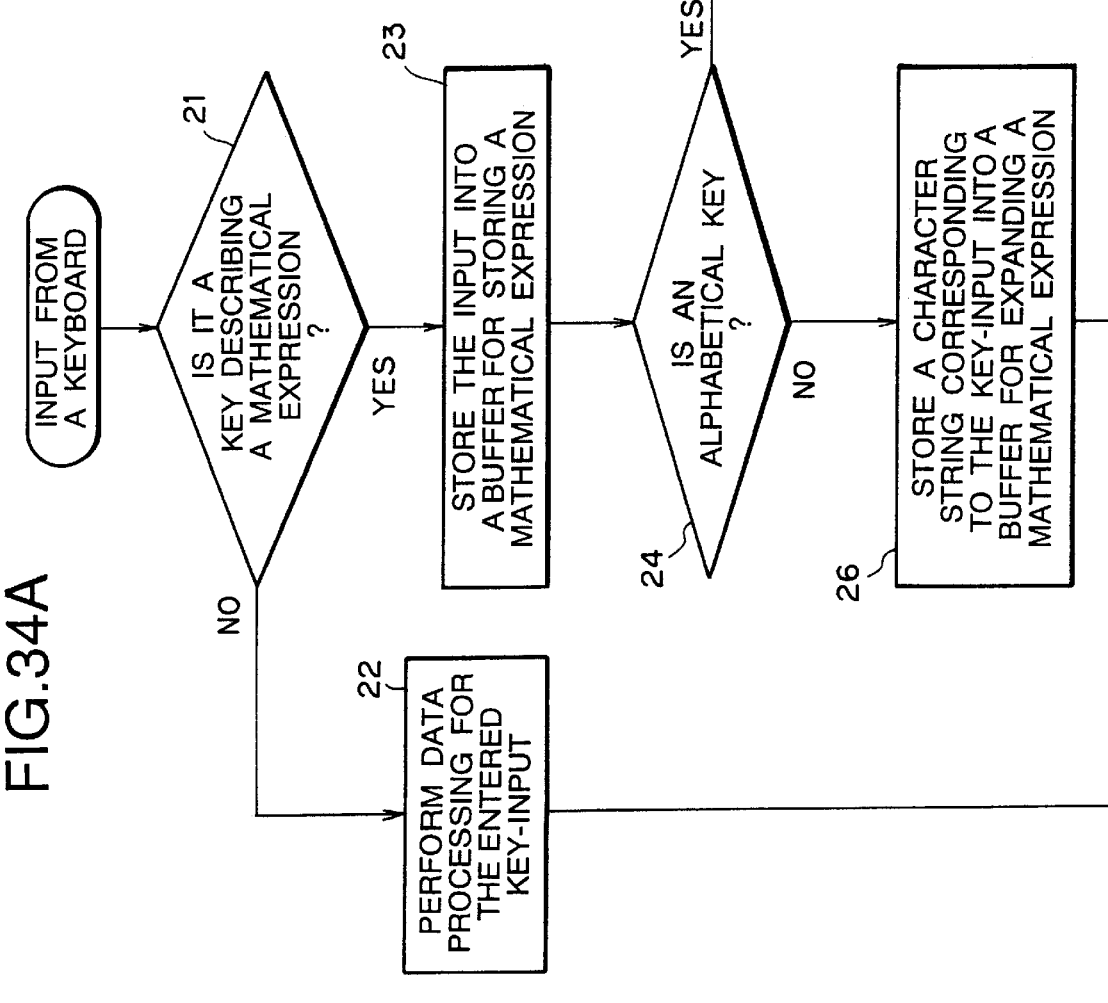

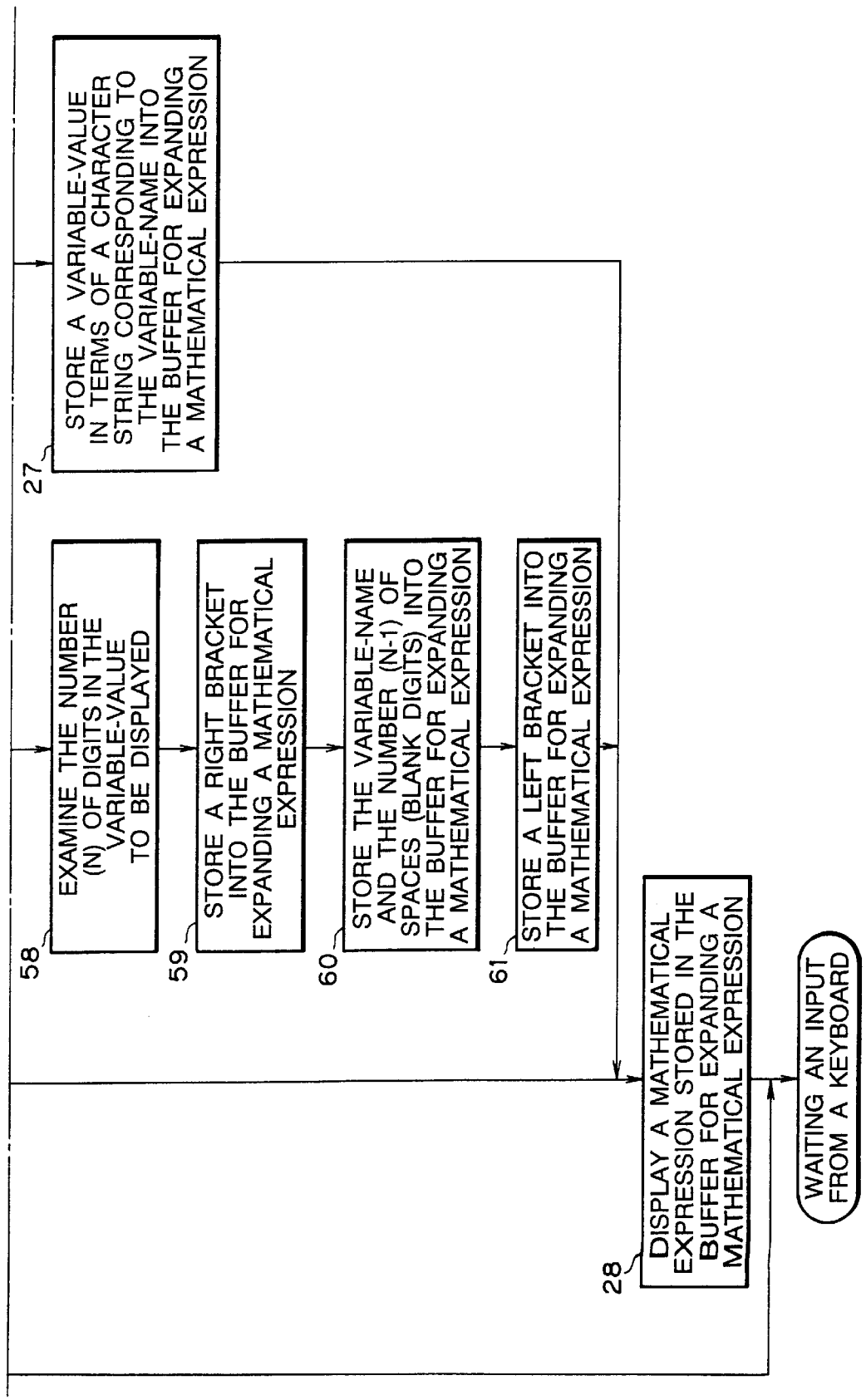

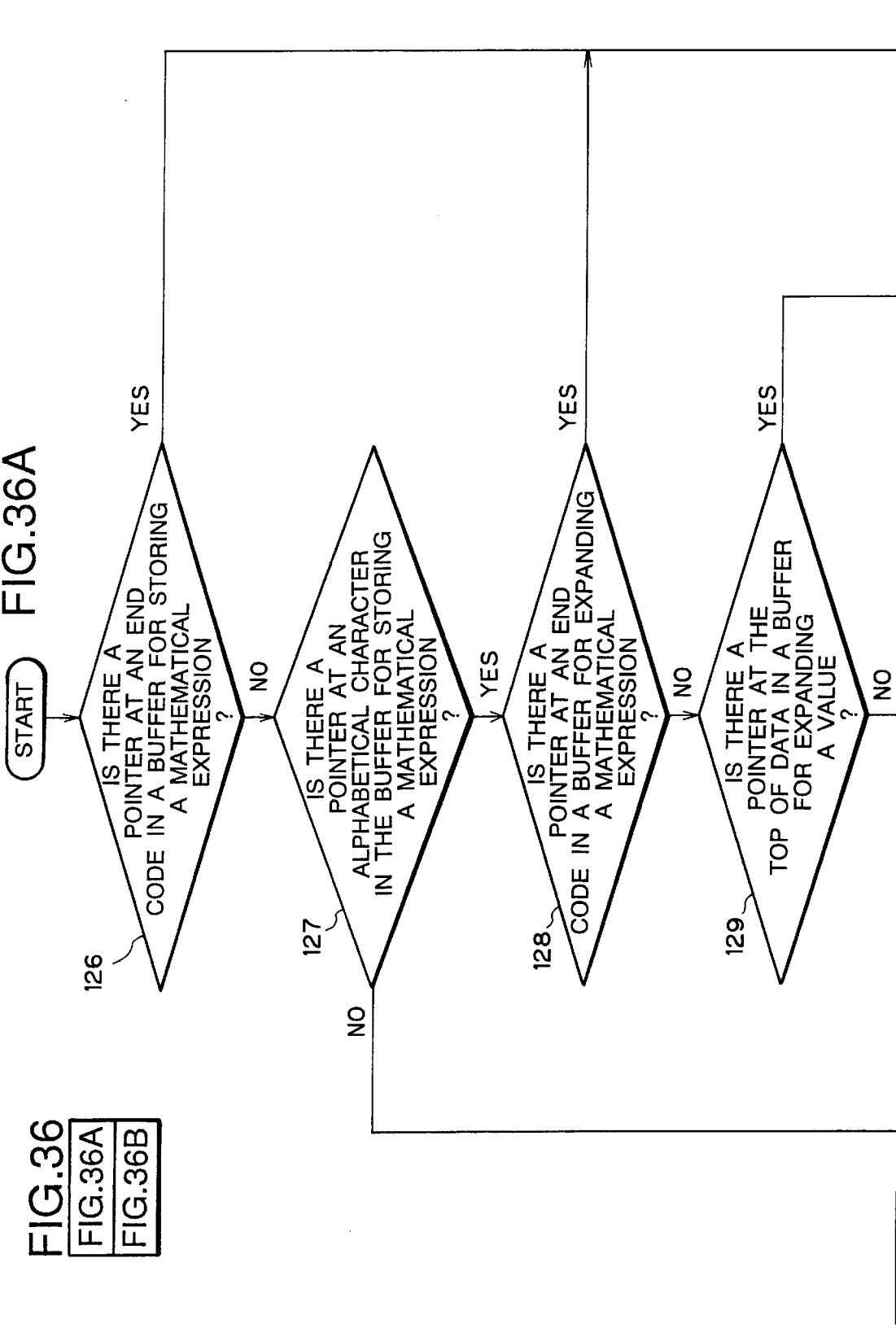

FIG.37
(a) PUT A CURSOR ON 3
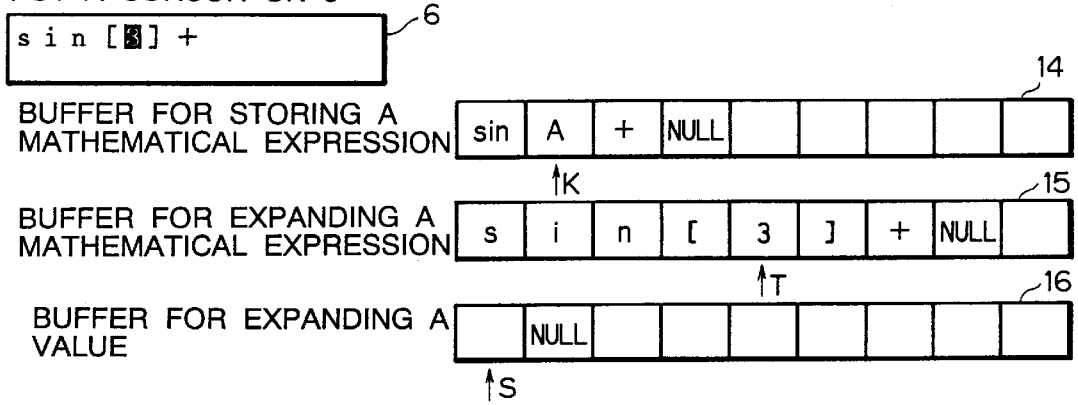
(b) DELETE 3
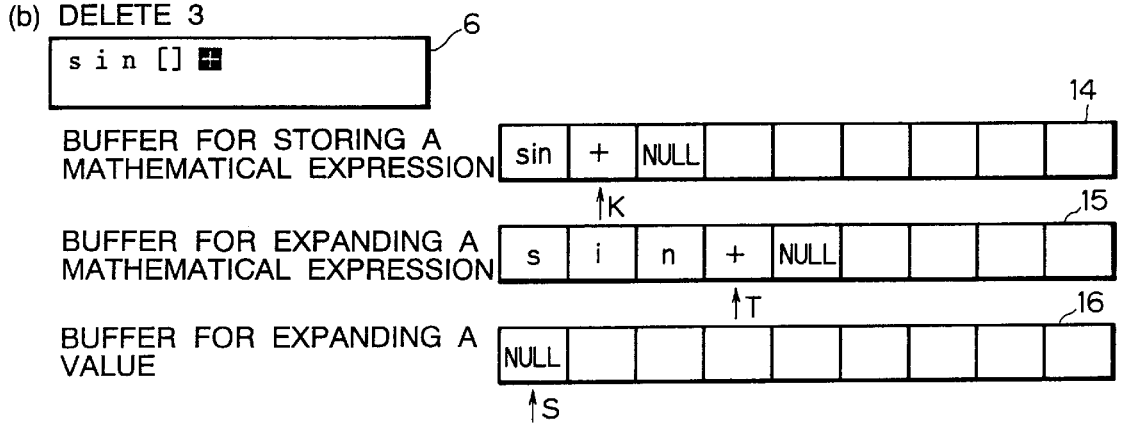

FIG.39

(a) PUT A CURSOR ON 3 s i n [3] +

BUFFER FOR STORING A MATHEMATICAL EXPRESSION

| sin | A | + | NULL | | | | | |
|---|---|---|---|---|---|---|---|---|

↑K

BUFFER FOR EXPANDING A MATHEMATICAL EXPRESSION

| s | i | n | [ | 3 | ] | + | NULL | |
|---|---|---|---|---|---|---|---|---|

↑T

BUFFER FOR EXPANDING A VALUE

| NULL | | | | | | | | |
|---|---|---|---|---|---|---|---|---|

↑S (b) DELETE 3 s i n [ ] +

BUFFER FOR STORING A MATHEMATICAL EXPRESSION

| sin | A | + | NULL | | | | | |
|---|---|---|---|---|---|---|---|---|

↑K

BUFFER FOR EXPANDING A MATHEMATICAL EXPRESSION

| s | i | n | [ | ] | + | NULL | | |
|---|---|---|---|---|---|---|---|---|

↑T

BUFFER FOR EXPANDING A VALUE

| NULL | | | | | | | | |
|---|---|---|---|---|---|---|---|---|

↑S (c) MOVE A CURSOR BY USING A KEY ▶ s i n [0] +

BUFFER FOR STORING A MATHEMATICAL EXPRESSION

| sin | A | + | NULL | | | | | |
|---|---|---|---|---|---|---|---|---|

↑K

BUFFER FOR EXPANDING A MATHEMATICAL EXPRESSION

| s | i | n | [ | 0 | ] | + | NULL | |
|---|---|---|---|---|---|---|---|---|

↑T

BUFFER FOR EXPANDING A VALUE

| NULL | | | | | | | | |
|---|---|---|---|---|---|---|---|---|

↑S

ELECTRONIC DEVICE AND METHOD OF DISPLAYING MATHEMATICAL EXPRESSIONS INCLUDING VARIABLES

BACKGROUND OF THE INVENTION

A miniature electronic device (e.g., a portable function calculator) usually inputs a mathematical expression by using a keyboard and displays the inputted mathematical expression on a liquid crystal display. A prior art miniature electronic device indicates a name of a variable in a mathematical expression and separately indicates a value (or values) of the variable on a display screen when a mathematical expression, e.g., <sin A+cos B+CD/8+E> including variables A, B, C, D and E is inputted, the expression is indicated on the first line and values for the variables A, B, C, D and E are indicated on the second and lower lines on a display screen. The result of calculation on the mathematical expression is stored in a variable Ans and its value is indicated on the lowest line. Thus, the conventional miniature electronic device (e.g., a portable function calculator) indicates not values but variable-names in a mathematical expression on a display screen when inputting variables.

However, the prior art miniature electronic device has such a limited display capacity that it can display only an input mathematical expression with a result of calculation in a usual calculation mode. To indicate a table of variable-values, it is necessary to change over a screen image to a specified mode. In other words, the prior art electronic device can not display all necessary information at a time on its display screen since the display screen is short in the number of lines and the number of digits per line. Namely, only a part of information can be displayed on the display screen due to the insufficient capacity of its display.

Accordingly, variables A, B, C, D and E and its values must be displayed by changing the screen image by scrolling. The mathematical expression must be also displayed in a specified portion on the screen by scrolling. Thus, the display of the variables and mathematical expressions require the troublesome scrolling operations.

One of prior arts relating to the present invention is a technique of substituting a variable-name by a variable-value. Japanese Laid-open Patent Publication (TOKKAI HEI) No. 6-119158 discloses a variable replacing device, which is explained as follows:

A variable replacing device is composed mainly of a converting section for reading a text to be converted, reading a variable-value from a variable-value control portion and replacing a variable-name contained in the text with the variable-value and a variable-result outputting portion for outputting the result onto a output device (e.g., a display or printer) or a conversion requesting source program.

In the converting portion, a variable-name extracting portion extracts a name of a variable by retrieving it in a text to be converted, a variable-value getting portion reads a value of the variable corresponding to the variable-name from the variable-value control portion, a variable-name analyzing portion analyzes the variable-name, a variable-value converting portion changes the form of representing the variable-value according to the analyzing result and variable-value replacing portion substitutes the variable-name by the variable-value. A variable-value setting portion is operated from a terminal to set and change a variable-name and a variable-value in the variable-value control portion. Thus, the variable-name in the text to be converted is substituted by the variable-value.

However, the processing unit is intended to change a variable-name in an already prepared text to be converted by a variable-value. Therefore it differs from the present invention by its object of conversion. This prior art device can not perform changing-over the indication from a variable-name to a variable-value and vice verse at any time if the need be and can not replace a variable-name with a variable-value while inputting a text to be converted.

As described above, the prior art electronic device can not easily refer to a variable-value since a variable-value and a mathematical expression must be referred separately by scrolling.

SUMMARY OF THE INVENTION

The present invention relates to an electronic device such as a function calculator, which is used for inputting a mathematical expression containing a variable and to a method of displaying the mathematical expression containing the variable.

The present invention has as its object the provision of an electronic device which is easy to operate and can display a mathematical expression by automatically replacing a variable therein with a designated value.

To achieve the above-mentioned purpose, the present invention provides firstly, an electronic device which comprises an input unit for inputting a mathematical expression including a variable, a memory device for storing a value of the variable and a display unit for displaying the mathematical expression on a display screen and characterized by providing conversion unit for reading a value of a variable contained in the mathematical expression from the memory device and substituting the read-out value into the variable in the mathematical expression to be displayed on the display screen.

In the electronic device thus constructed, a mathematical expression containing a variable is inputted by the input unit. The conversion unit reads a value for the variable contained in the mathematical expression from the memory device and replaces the variable with the read-out value. The display means displays on its screen the mathematical expression wherein the variable was substituted by the value. Thus, this invention can display values for variables on a display screen of the display means while the conventional electronic device does not display variable-values on its display screen.

The present invention provides secondly, an electronic device which has the same construction as the first invention and which is characterized by providing a display-mode selecting key for selecting either a first mode of displaying a mathematical expression on the display screen by the display means after substituting the read value into the variable by the conversion unit or a second mode of displaying the variable in terms of a variable-name on the display screen by the display means.

In this invention, the display mode can be changed by an input from the display-mode selecting key. In the first display mode, a mathematical expression, wherein variables were substituted by respective values, is displayed on a display screen. In the second display mode, variables are displayed in terms of variable-names in the same way that the conventional electronic device does. The display-mode selecting key enables a user to easily refer to each variable-name and corresponding variable-value by a simple key operation.

The present invention provides thirdly, a method of displaying a mathematical expression containing a variable, which substitutes a variable in a mathematical expression by a value read from a memory device, stores the mathematical expression in a buffer and then displays the mathematical expression stored in the buffer on a display screen.

In this invention, an input mathematical expression is first subjected to substitution of its variable by a value and then stored into a buffer. The stored mathematical expression is then displayed on a display screen, thus enabling displaying the expression with a value having substituted for a variable.

The present invention provides fourthly, a method of displaying a mathematical expression containing a variable as defined in the third invention, which is characterized in that a beginning mark and an end mark are inserted respectively before and after the variable-value in the mathematical expression when substituting and, then, the mathematical expression is stored in the buffer when storing.

In this invention, a beginning mark and an end mark are inserted respectively before and after a value put instead of a variable, for example, the value bracketed to distinguish the variable-value from other elements in a mathematical expression to be displayed on a display screen. When variable-values are successively input with an omitted multiplicative operator, they can be distinguished from each other by the beginning and ending marks.

The present embodiment provides fifthly, a method of displaying a mathematical expression containing a variable as defined in the third or fourth invention, which is characterized by provision of a pointer indicating a position in the buffer, displaying a cursor at the position indicated by the pointer, moving the pointer by using cursor-moving keys and editing the mathematical expression by using the inputting means on the display screen.

In this invention, the buffer is provided with the pointer indicating a location thereon. A cursor is indicated at the position, indicated by the pointer, on a display screen. The pointer together with the cursor can be moved by using the cursor moving keys. An input mathematical expression can be edited with reference to the cursor position.

BRIEF DESCRIPTION OF DRAWINGS

FIG. 1 shows an example of a mathematical expression containing variables, which is displayed on a display screen of a conventional electronic device.

FIG. 2 shows an example of a mathematical expression containing variables, which is displayed on a display screen of a conventional miniature electronic device.

FIG. 6 shows an example of contents of buffers for storing a mathematical expression, an expanded expression and values for the expanded expression, which are used in the first embodiment of the present invention.

FIG. 7 shows an example of a content of a character conversion table used in the first embodiment of the present invention.

FIG. 9 is a view for explaining an example of processing by the first embodiment of the present invention.

FIGS. 10, 10A, 10B are a flow chart describing operation steps of a second embodiment of the present invention.

FIG. 11 is a view for explaining an example of processing by the second embodiment of the present invention.

FIGS. 14, 14A, 14B are a flow chart describing an example of processing a cursor movement.

FIGS. 19, 19A, 19B are a flow chart showing an example of processing an input from an input key for moving a cursor to the right.

FIGS. 20, 20A, 20B, 20C are a flow chart showing an example of processing an input from an input key for moving a cursor to the left.

FIG. 22 is a view for explaining an example of numeral-input processing.

FIG. 23 is a view for explaining another example of numeral-input processing.

FIGS. 24, 24A, 24B are a flow chart describing an example of processing an input from a DEL (delete) key for eliminating data.

FIG. 25 is a view for explaining an example of data-deleting processing.

FIG. 29 is a view for explaining another example of data-clearing processing.

FIG. 30 shows an example of data displayed on a liquid-crystal display of a third embodiment of the present invention.

FIGS. 34, 34A, 34B are is a flow chart describing an example of processing inputs from a keyboard of a fifth embodiment of the present invention.

FIG. 36, 36A, 36B are is a flow chart describing an example of processing an input from a DEL (delete) key for eliminating data.

FIG. 37 is a view for explaining an example of data-deleting processing.

FIG. 39 is a view for explaining an example of data-clearing processing.

PREFERRED EMBODIMENTS OF THE INVENTION

Prior to explaining preferred embodiments of the present invention, prior art miniature electronic device will be described below as references for the present invention.

A miniature electronic device (e.g., a portable function calculator) usually inputs a mathematical expression by using a keyboard and displays the inputted mathematical expression on a liquid crystal display. A prior art miniature electronic device indicates a name of a variable in a mathematical expression and separately indicates a value (or values) of the variable on a display screen for example as shown in FIG. 1. When a mathematical expression, e.g., <sin A+cos B+CD/8+E> including variables A, B, C, D and E is inputted, the expression is indicated on the first line and values for the variables A, B, C, D and E are indicated on the second and lower lines on a display screen as shown in FIG. 1. The result of calculation on the mathematical expression is stored in a variable Ans and its value is indicated on the lowest line. Thus, the conventional miniature electronic device (e.g., a portable function calculator) indicates not values but variable-names in a mathematical expression on a display screen when inputting variables.

However, the prior art miniature electronic device has such a limited display capacity that it can display only an input mathematical expression with a result of calculation in a usual calculation mode. To indicate a table of variable-values as shown in FIG. 1, it is necessary to change over a screen image to a specified mode. In other words, the prior art electronic device can not display all necessary information at a time on its display screen since the display screen is short in the number of lines and the number of digits per line. Namely, only a part of information shown in FIG. 1 can be displayed on the display screen, for example, as shown (a) in FIG. 2 due to the insufficient capacity of its display.

Accordingly, variables A, B, C, D and E and its values must be displayed by changing the screen image by scrolling. The mathematical expression must be also displayed in a specified portion on the screen by scrolling as shown (b) in FIG. 2. Thus, the display of the variables and mathematical expressions requires the troublesome scrolling operations.

Figure 3:
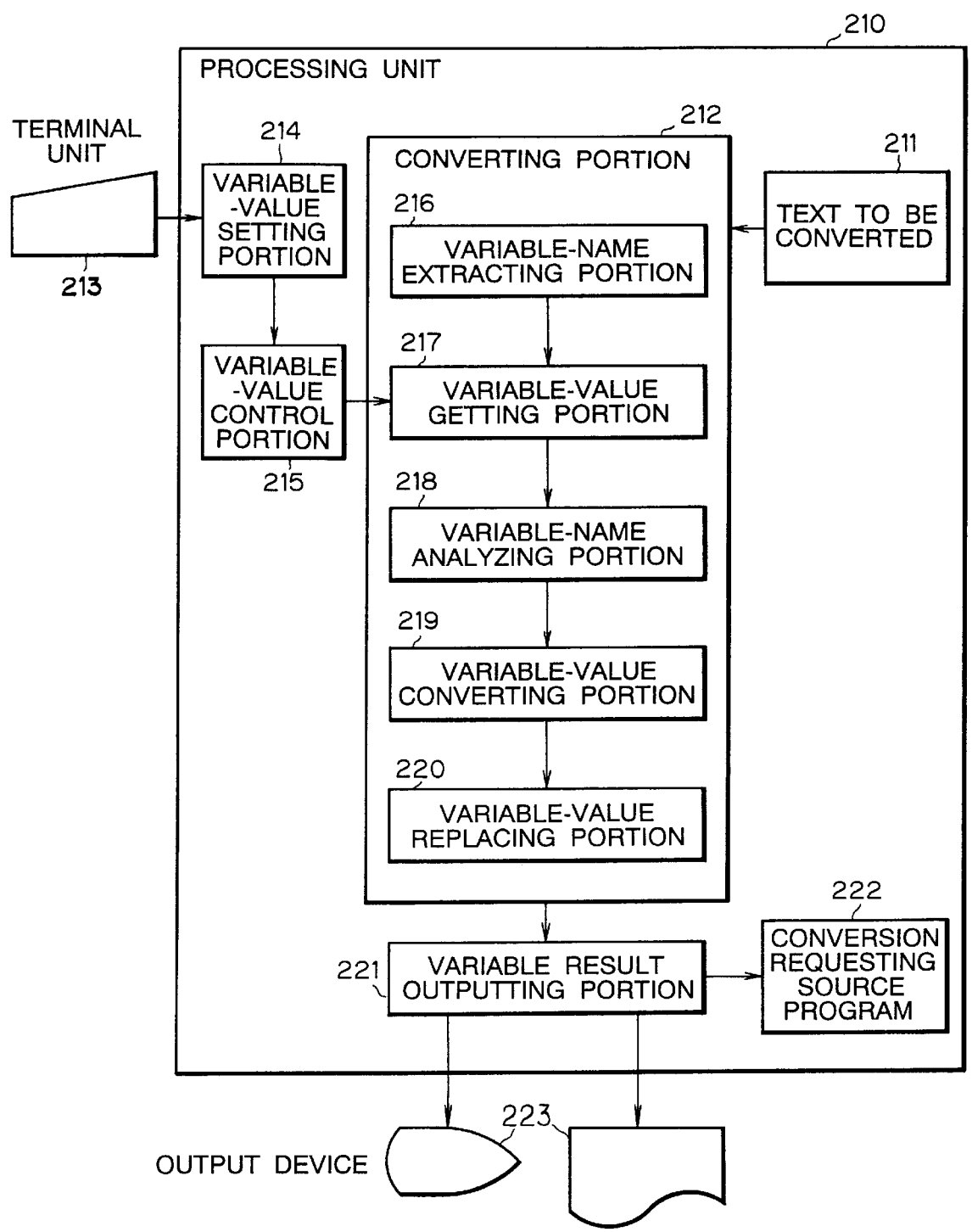
FIG. 3 is a view for explaining a conventional processing device for replacing a variable by a value.

One of prior arts relating to the present invention is a technique of substituting a variable name by a variable-value. Japanese Laid-open Patent Publication (TOKKAI HEI) No. 6-119158 discloses a variable replacing device, which is explained as follows:

Referring to FIG. 3, a variable replacing device 210 is composed mainly of a converting section 212 for reading a text to be converted 211, reading a variable-value from a variable-value control portion 215 and replacing a variable-name contained in the text with the variable-value and a variable-result outputting portion 221 for outputting the result onto a output device 223 (e.g., a display or printer) or a conversion requesting source program 222.

In the converting portion 212, a variable-name extracting portion 216 extracts a name of a variable by retrieving it in a text to be converted 211, a variable-value getting portion 217 reads a value of the variable corresponding to the variable-name from the variable-value control portion 215, a variable-name analyzing portion 218 analyzes the variable-name, a variable-value converting portion 219 changes the form of representing the variable-value according to the analyzing result and variable-value replacing portion 220 substitutes the variable-name by the variable-value. A variable-value setting portion 214 is operated from a terminal 213 to set and change a variable-name and a variable-value in the variable-value control portion 215. Thus, the variable-name in the text to be converted 211 is substituted by the variable-value.

However, the processing unit 210 is intended to change a variable-name in an already prepared text to b e converted 211 by a variable-value. Therefore it differs from the present invention by its object of conversion. This prior art device can not perform changing-over the indication from a variable-name to a variable-value and vice verse at any time if the need be and can not replace a variable-name with a variable-value while inputting a text to be converted 211.

As described above, the prior art electronic device can not easily refer to a variable-value since a variable-value and a mathematical expression must be referred separately by scrolling.

[First Embodiment]

Figures 4, 5:
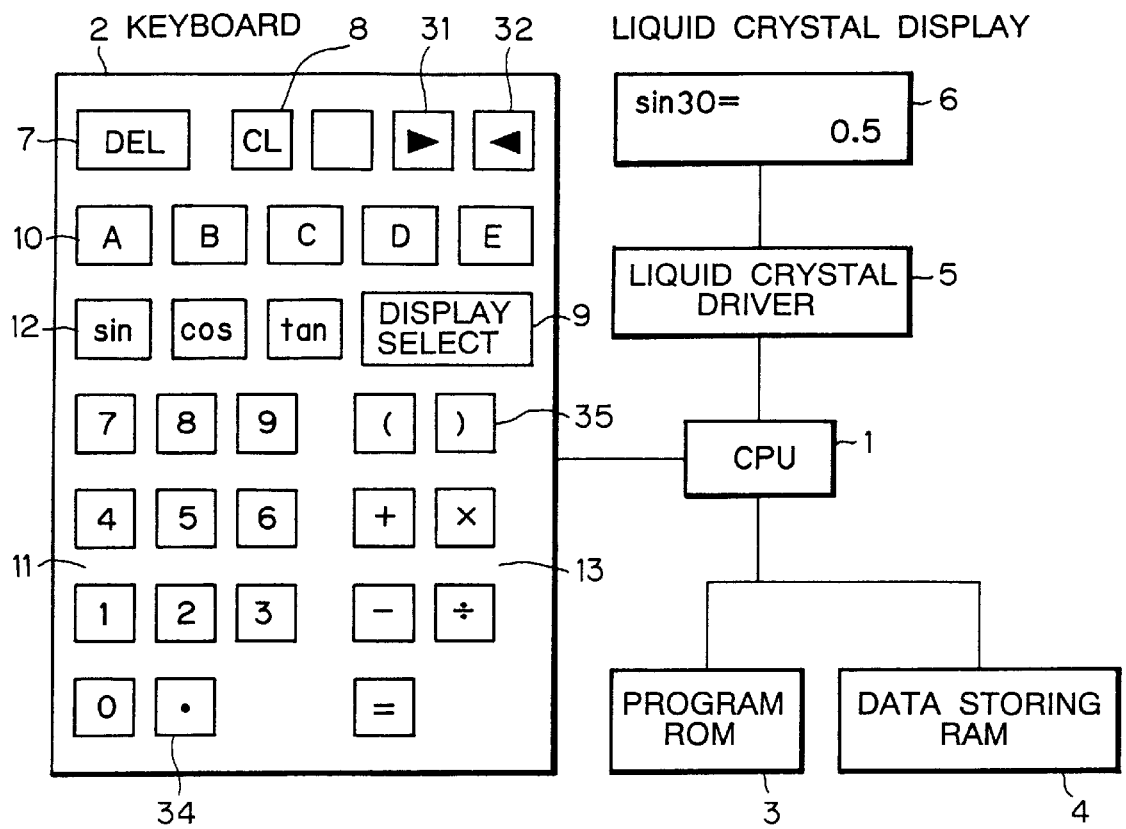
FIG. 4 is a block diagram of a first embodiment of the present invention.
FIG. 5 shows an example of a content of a buffer for storing variable-values, which is used in the first embodiment of the present invention.

Referring to FIGS. 4 to 14, the first embodiment of the present invention will be described as follows: FIG. 4 is a block diagram of a system of an electronic functional calculator which is the first embodiment of the present invention. The system is controlled by a central processing unit (CPU) 1 whereto a signal is input through a keyboard 2 connected thereto.

A program read-only-memory (ROM) 3 holds a program. A data store random-access-memory (RAM) 4 is used for storing a mathematical expression, variable-values, a status flag and other information while performing the program. A mathematical expression is displayed on a screen of a liquid-crystal-display (LCD) 6 with a liquid crystal driver 5. As shown, for example, in FIG. 4, a mathematical expression inputted from the keyboard 2 together with a calculation result is displayed on the screen of the LCD 6.

The keyboard 2 consists of a variety of keys, i.e., a delete (DEL) key 7, a clear (CL) key 8, a rightward cursor-moving key 31, a leftward cursor-moving key 32, display mode selecting key 9, alphabetical character (A–E) keys 10, numeral (0–9) keys 11, a decimal key 34, functional (sin, cos, tan) keys 12, right and left brackets keys 35 and operator (+,– and so on) keys 13. The alphabetical character keys 10 are not limited to the shown keys and may be increased or decreased in quantity as the need be. These character keys 10 are used for inputting names of variables. Functional keys 12 are not limited to the shown trigonometric functions and keys for logarithmic function and exponential function may be provided.

The RAM memory 4 consists a buffer for storing variable-values (FIG. 5) for storing values for variables A, B, C, D and E, a buffer for storing a mathematical expression 14 (FIG. 6), a buffer for expanding a mathematical expression 15 (FIG. 6) for expanding the stored mathematical expression into a character string to be displayed, a buffer for expanding a value 16 (FIG. 6) for expanding variable-values into a character string and a value displaying flag (not shown) for indicating a status in which a variable is displayed in terms of its value or name. In FIG. 6, NULL codes are end codes for information stored in the buffers 14, 15 and 16.

The buffer for storing a variable-values shown in FIG. 5 stores values corresponding to respective variable-names A, B, C, D and E as well as a variable-name Ans and its value, which correspond to a calculation result. In the initial state, all variable-values are zero in the buffer. This embodiment will be explained with the buffer containing inputted therein variable-values shown in FIG. 5. A mathematical expression is stored in terms of key codes in the buffer for storing a mathematical expression 14 (FIG. 6) and is developed into a character string to be displayed on the display 6 (FIG. 4).

For example, a sin key is now pressed and the sin key-code is stored in the buffer for storing a mathematical expression 14 (FIG. 6). On the other hand, the input code is developed into a string of three characters 's', 'i' and 'n', which is stored in the buffer for expanding a mathematical expression 15 (FIG. 6) and which is displayed on the LCD 6 (FIG. 4). Therefore, the ROM 3 stores a character conversion table (FIG. 7) which defines character strings corresponding to respective key-codes.

The display-mode selecting key 9 (FIG. 4) is used for selecting that variables are displayed in terms of their names or values on the LCD 6 (FIG. 4). The display-mode key 9 (FIG. 4) turns ON or OFF the value-displaying flag (not shown). With the flag being ON, the LCD 6 works in the variable-value display mode in which a mathematical expression is displayed with variable-values substituted into respective variable-names. With the flag (not shown) being OFF, the LCD works in variable-name mode for displaying a mathematical expression containing variables represented by names (character codes).

Figure 8:
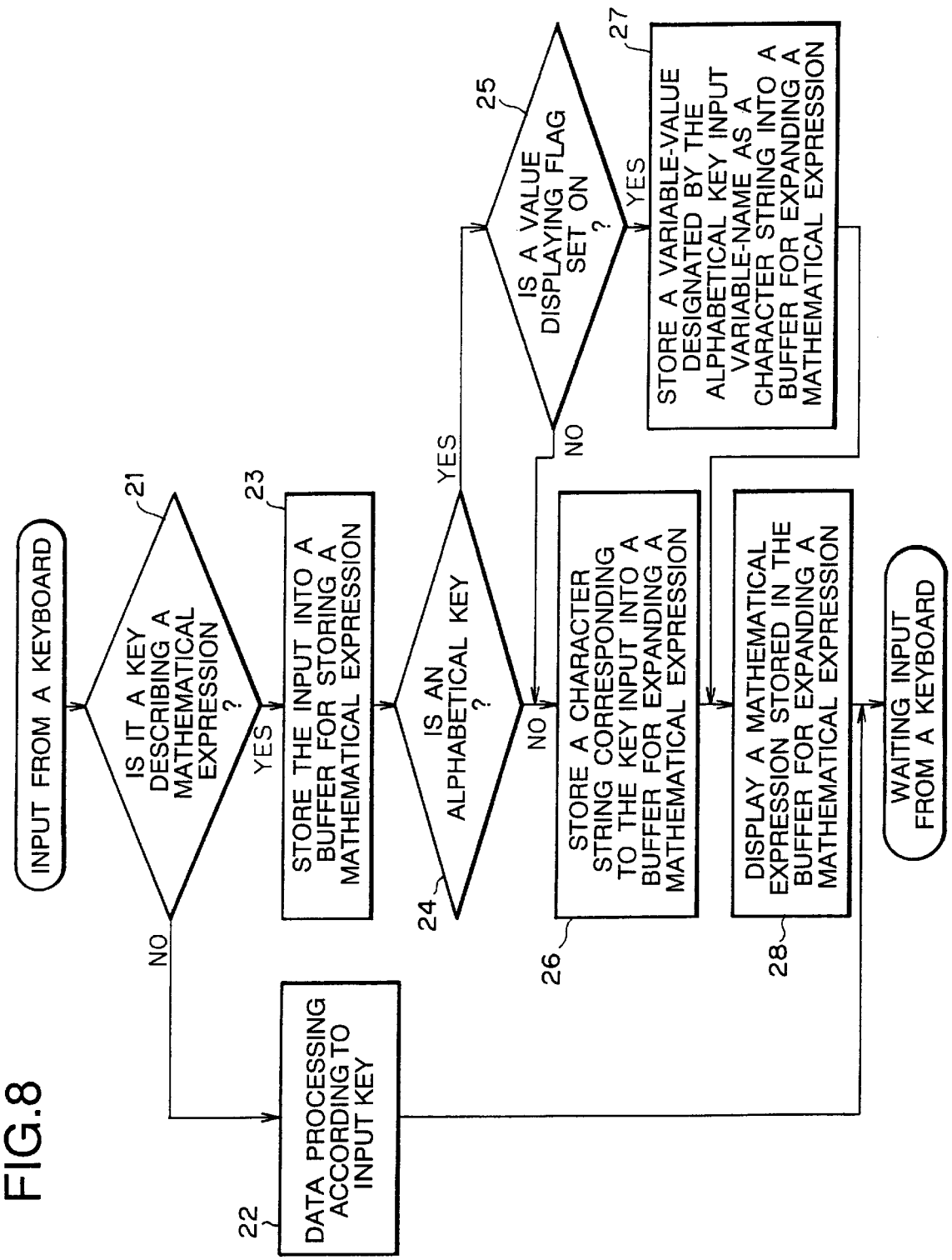
FIG. 8 is a flow chart describing an example of processing inputs from a keyboard for the first embodiment of the present invention.

An example of programmed processing algorithm for an input entered from the keyboard 2 (FIG. 4) is described in a flow chart of FIG. 8. FIG. 9 shows an example of processing operations on a keyed-in input of a mathematical expression sin A. The processing algorithm with an input mathematical expression sin A (FIG. 9) is described first as follows: In an initial state with no mathematical expression inputted, the buffer for storing a mathematical expression 14 and buffer for expanding a mathematical expression 15 contain, respectively, an END code (NULL code) at the top of field as shown (a) in FIG. 9. An arrow mark K is a pointer showing a place for locating an input in the buffer for storing a mathematical expression 14 while an arrow mark T is a pointer showing a place for locating an input in the buffer for expanding a mathematical expression 15. They are hereinafter referred to as pointers K and T respectively.

With an input of a sin key, the system judges, as shown at Step 21 in FIG. 8, that the keyed-in input sin relates to one of keys used for describing a mathematical expression. The mathematical expression describing keys may be alphabetical character keys 10 used for inputting a mathematical expression, functional keys 12, numeral keys 11, a decimal key 34, left and right bracket keys 35 and operator keys 13. As the sin key is the mathematical expression describing key, the process advances to Step 23 for storing a key code into the buffer for storing a mathematical expression 14.

The sin-key code is stored at the head position of area in the buffer for storing a mathematical expression 14. At the next Step 24, the sin key is judged to be an alphabetical character key or not. As the sin key is not an alphabetical character key, the process advances to Step 26 that reads a character string "sin" corresponding to the sin key from the character conversion table (FIG. 7) and stores the character string "sin" into the buffer for expanding a mathematical expression 15.

At Step 28, the system displays the mathematical expression stored in the buffer for expanding a mathematical expression 15 on a screen of the LCD 6 (FIG. 4) and waits for an input from the keyboard. Thus, the buffer for storing a mathematical expression 14 and the buffer for expanding a mathematical expression 15 are turned into the respective states as shown (b) in FIG. 9. In the buffer for storing a mathematical expression 14, the sin-key code is stored at the head position therein before the end code. The pointer K is moved to a next-inputting place where the end code is stored. In the buffer for expanding a mathematical expression 15, a character string "sin" is stored at the head position therein followed by the end code. The pointer T is moved to the place where the end code is stored.

With a next A key input entered from the keyboard 2, the system executes Step 21 to judge the A key input being used for describing a mathematical expression and then Step 23 to store a key code of the A key into the buffer for storing a mathematical expression 14. The process further advances to Step 24 that judges the key to be alphabetical character keys or not. As the A key is an alphabetical character key, the process advances to Step 25 that determines whether the value displaying flag (not shown) is set (ON) or unset (OFF).

With the value displaying flag (not shown) being unset (OFF), the process proceeds to Step 26 that reads a character string "A" corresponding to the A key from the character conversion table (FIG. 7) and stores the character string "A" into the buffer for expanding a mathematical expression 15. With the value displaying flag (not shown) being set (ON), the process advances from Step 25 to Step 27 that reads a variable-value corresponding to the alphabetical character (i.e., the variable-name) from the buffer for storing variable-value (FIG. 5), converts the value into a character string (i.e., "30" in this case) and stores it into the buffer for expanding a mathematical expression 15. At step 28, the system displays the mathematical expression stored in the buffer for expanding a mathematical expression 15 and waits for a next input.

With the value displaying flag (not shown) being OFF, the A key code is stored after the sin key code and is followed by the end code in the buffer for storing a mathematical expression 14 as shown (c-1) in FIG. 9. The pointer K moves to a place where the end code located. In the buffer for expanding a mathematical expression 15, character string "sin A" is stored with the end code shifted thereafter in the buffer for expanding a mathematical expression 15. The Pointer T indicates the end code at the new position. Thus, the process is executed in the variable-name mode represented by OFF state of the value displaying flag.

With the value-displaying flag being set (ON), the buffer for storing a mathematical expression 14 stores therein the sin key code, the A key code and the end code in said order while the buffer for expanding a mathematical expression 15 stores therein the string of characters "sin30" with end code located thereafter.

Thus, this embodiment system, while receiving inputs of a mathematical expression, processes and displays the mathematical expression by executing the algorithm according to the flow chart of FIG. 8. When receiving an input from a key (e.g., delete (DEL) key) other than the mathematical expression describing keys, the system advances the process from Step 21 to Step 22 to be explained later.

Figure 10B:
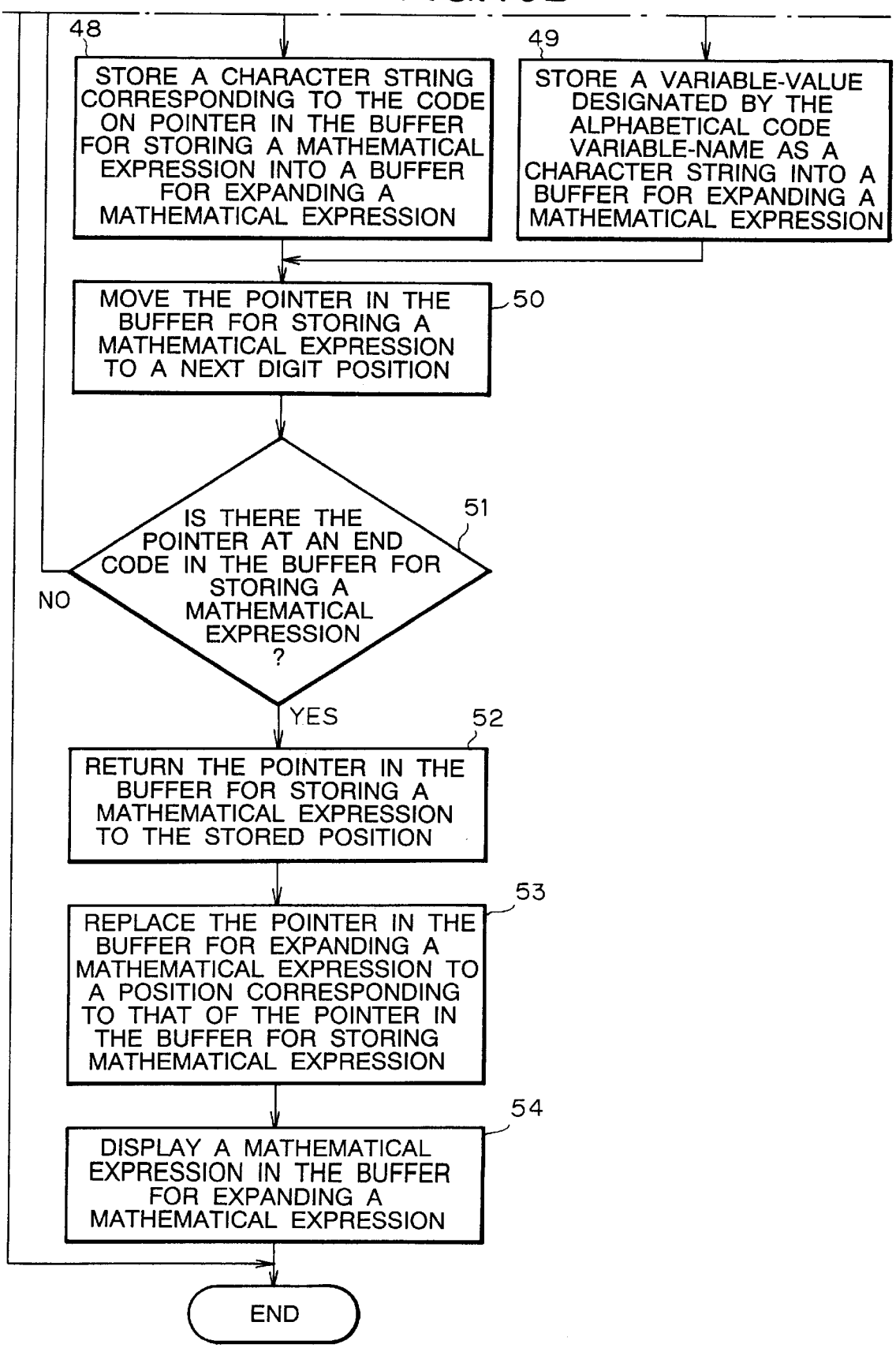

An exemplified process to be performed for an input entered from the display-mode selecting key 9 (FIG. 4) is described as follows:

With the input from the display-mode selecting key 9 during inputting of a mathematical expression, the system proceeds to Step 22 (in FIG. 8) calling an algorithm according to the flow chart shown in FIG. 10 in response to the input from the display-mode selecting key.

At Step 41, the value displaying flag (not shown) is turned to a reverse state. At Step 42, the top code in the buffer for storing a mathematical expression is examined to be the end code or not. If so, the current processing ends since there is no mathematical expression in the buffer for storing a mathematical expression. Namely, the processing is turned to the precedent algorithm that called the algorithm for processing the display-mode selecting input. The end of the current process means hereinafter that the called algorithm is ended and transfers the operation to the calling algorithm.

When Step 42 determined the top code is not end code in the buffer for storing a mathematical expression 14, the algorithm for processing an input of the display-mode selecting key, shown in FIG. 11, as an example, is further explained as follows:

As shown (a) in FIG. 11, the buffer for storing a mathematical expression 14 contains a sin key code, an A key code and a + key code inputted therein and the value displaying flag (not shown) is unset (OFF). In this state, an input from the display-mode selecting key is effective.

With an input from the display-mode selecting key, the system executes the algorithm of FIG. 10: It turns ON the value displaying flag (not shown) at Step 42, omits Step 42 (since the top code in the buffer for storing a mathematical expression is not the end code), memorizes the location of the pointer K in the buffer for storing a mathematical expression at Step 43 and then advances the pointer K to the head position in the buffer for storing a mathematical expression 14 at Step 44.

At Step 45, the system clears off the content of the buffer for expanding a mathematical expression 15 realizing the initial state of the buffer with the end code located at the top position therein. This is accompanied by shifting the pointer K to the head position in the buffer for storing a mathematical expression 14. The content of the buffer for expanding a mathematical expression 15 is cleared off and the end code is stored at the head position therein. The pointer T is also sifted to the head position.

At Steps 46 to 51 (FIG. 10), the system performs the process for key inputs in the buffer for storing a mathematical expression 14 in the same manner as described according to the flow chart of FIG. 8 and expands the mathematical expression in the buffer for expanding a mathematical expression 15: Step 46 determines whether a key code indicated by the pointer K is an alphabetical character key or not. As shown (b) in FIG. 11, the top code is not an alphabetical character key code but a sin key code because the pointer K exists at the head position in the buffer for storing a mathematical expression 14. Therefore, the process advances to Step 48 that reads a character string "sin" corresponding to the sin key code from the character conversion table (FIG. 7) and stores it into the buffer for expanding a mathematical expression 15.

The process proceeds to Step 50 that moves the pointer K in the buffer for storing a mathematical expression backward (to the right) by one digit. Thus, the pointer K moves from the sin key code to the next A key code as shown (c) in FIG. 11. The buffer for expanding a mathematical expression 15 stores a character string "sin" and the end code in turn. The pointer T moves to the end code position.

At Step 51, it is examined whether a code at a position indicated by the pointer K in the buffer for storing a mathematical expression is the end code or not. As shown (c) in FIG. 11, the pointer K indicates the A key code (not the end code), the process returns to Step 46 whereat it is further examined whether the A key code is an alphabetical character or not. As the A key code is an alphabetical character, the process proceeds to Step 47 whereat it is examined whether the value displaying flag is ON or not.

In FIG. 11, the value displaying flag (not shown) is set ON by the input from the display-mode selecting key, so the process proceeds to Step 49 whereat a value for the variable A is read from the buffer for storing variable-value (FIG. 5) and converted into a character string "30" which is then stored into the buffer for expanding a mathematical expression 15. The process advances to Step 50 to move the pointer K backward by one digit in the buffer for storing a mathematical expression 14.

Consequently, the variable A is expanded and the pointer K is located at a position of the + key code in the buffer for storing a mathematical expression 14 as shown (c) in FIG. 11. In the buffer for expanding a mathematical expression 15, the variable A is expanded into a character string "30" of the variable-value, which is stored at a place after the character string "sin".

At Step 51, it is examined whether the + key code at a position indicated by the pointer K is the end code or not. As the + key code is not the end code, the process returns to Step 46. The + key code is not an alphabetical character, the process advances to Step 48 whereat a character string + is stored into the buffer for expanding a mathematical expression 15.

At Step 50, the pointer K is moved backward by one digit to indicate the end code as shown (e) in FIG. 11. In the buffer for expanding a mathematical expression 15, a character string "+" is added and the end code is located thereafter. The pointer T is located at a position of the end code.

At Step 51, it is examined whether the key code at a position indicated by the pointer K is the end code or not. As the pointer K indicates the end code, the process proceeds to Step 52 whereat the pointer K is returned to the position where it was located and memorized at Step 43. At Step 53, the pointer T of the buffer for expanding a mathematical expression 15 is moved to a position corresponding to the position of the pointer K of the buffer for storing a mathematical expression 14.

As shown (f) in FIG. 11, the pointer K is located at the same position as that shown (a) in FIG. 11. The pointer T of the buffer for expanding a mathematical expression 15 is also located at a position therein, which corresponds to the position of the pointer K of the buffer for storing a mathematical expression 14. At Step 54, a mathematical expression stored in the buffer for expanding a mathematical expression 15 is displayed on a screen of the LCD 6 (FIG. 4).

Figure 12:
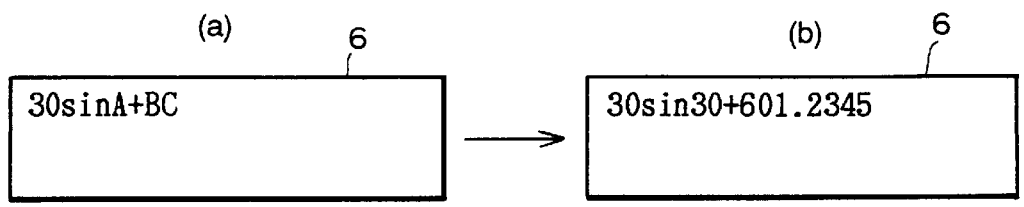
FIG. 12 shows an example of displaying a mathematical expression on a liquid-crystal display of the second embodiment of the present invention.

When the mathematical expression 30sinA+BC including variables A, B and C is inputted to the system with the value displaying flag (not shown) being unset (OFF), the liquid-crystal display (LCD) 6 displays an image as shown (a) in FIG. 12. With an input entered from the display-mode selecting key, the value displaying flag (not shown) is turned ON and the LCD 6 shows an image as shown (b) in FIG. 12. On the contrary, if an input from the display-mode selecting key is entered into the system with the value displaying flag being set (ON), the LCD 6 changes its screen image from (b) to (a) in FIG. 12.

Figure 13:
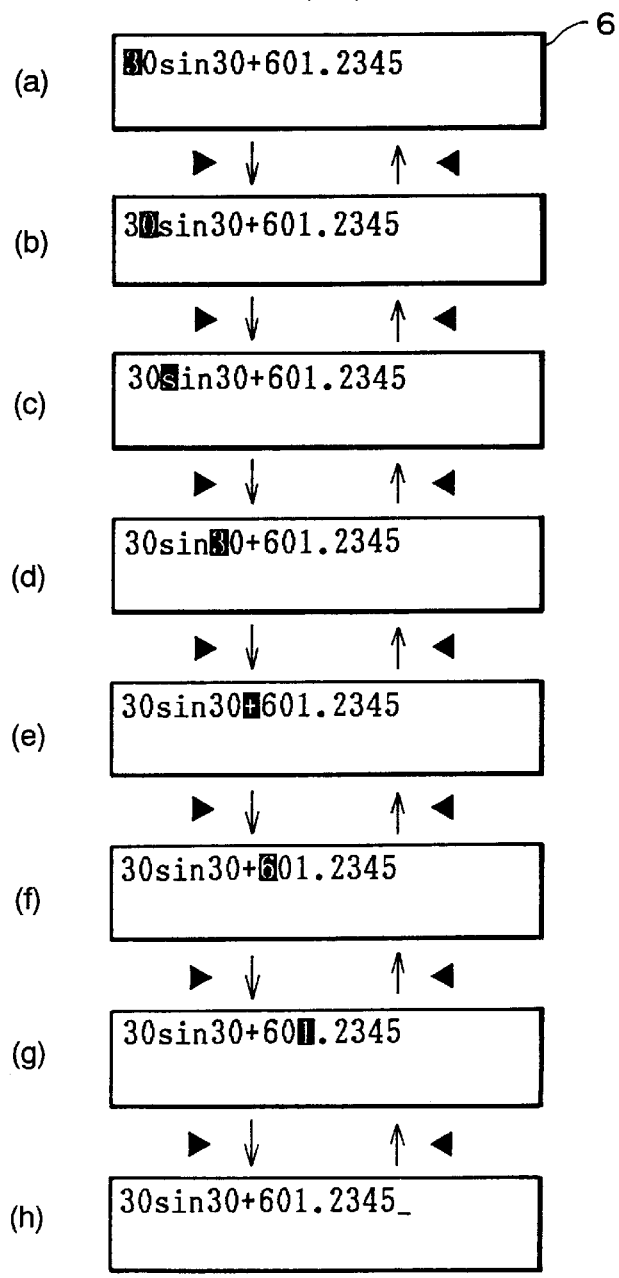
FIG. 13 shows an example of moving a cursor on a liquid-crystal display of the second embodiment of the present invention.
Figure 14B:
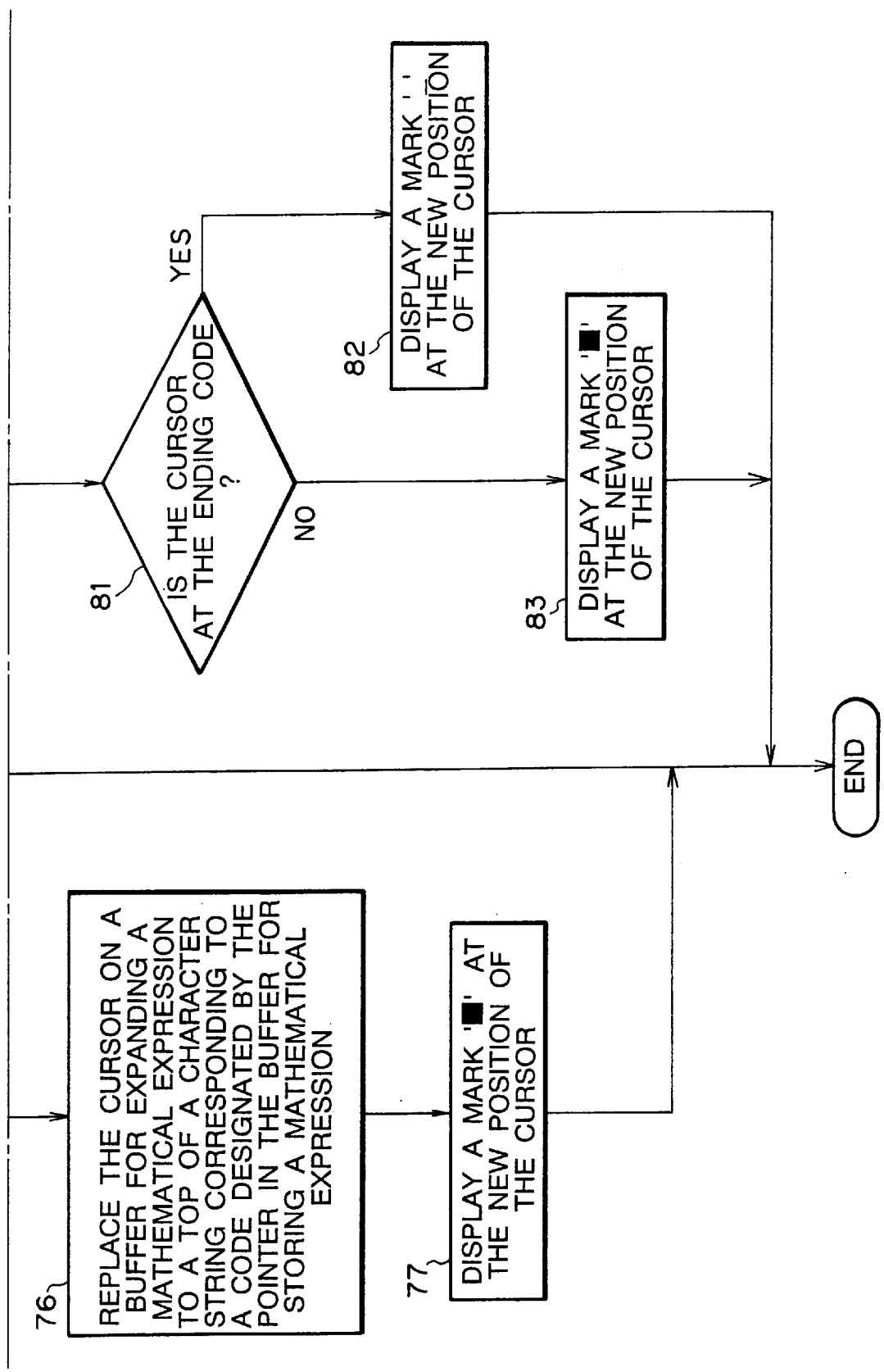

Referring to FIGS. 13 and 14, an exemplified process for inputs from cursor moving keys will be described below:

FIG. 13 shows the way in which cursors are moved by the effect of inputs entered by the cursor-moving keys when the LCD 9 indicates the image shown (b) in FIG. 12. In this instance, a position of pointer T in a buffer for expanding a mathematical expression 15 (FIG. 13) is a position where a cursor is indicated. FIG. 14 is a flow chart describing procedures according to an algorithm to be performed for inputs entered from cursor-moving keys. With an input from a cursor-moving key, the process of FIG. 8 proceeds to Step 22 for calling the algorithm of FIG. 14 to be performed for the above-mentioned input.

With the cursor-moving-key input, the system starts the process of FIG. 13 from Step 71 whereat the input is judged whether an input entered from a key for moving a cursor rightward or not. If so, the process proceeds to Step 78 whereat the cursor is judged whether an underline cursor (i.e., an underline displayed at the right end of a mathematical expression) or not. If the cursor is an underline cursor, the process ends since the cursor exists at the right end of the mathematical expression.

If the cursor is not the underline cursor, the process advances from Step 78 to Step 79 whereat the pointer K is moved backward by one digit in the buffer for storing a mathematical expression 14. Next, At Step 80, the cursor in the buffer for expanding a mathematical expression 15 is moved to the top of a character string corresponding to the code indicated by the pointer K in the buffer for storing a mathematical expression 14. At Step 81, it is examined whether the cursor is located at the end code or not.

If the cursor indicates the end code position, the process proceeds to Step 82 whereat the underline cursor is displayed at the new position. If not so, the usual (square block in the embodiment) cursor is displayed at the new position (Step 83).

With an input of a key for moving a cursor leftward, the process advances from Step 71 to Step 72 and then Step 74 whereat the cursor is judged to exist at the top of the mathematical expression or not. If the cursor exists at the top of the mathematical expression, the process ends since the cursor can not be moved further leftward. If not so, the process continues at Step 75 to move the pointer K forward by one digit in the buffer for storing a mathematical expression 14. The process then proceeds to Step 76 whereat the cursor in the buffer for expanding a mathematical expression 15 is moved to the top of the character string corresponding to the code indicated by the pointer in the buffer for storing a mathematical expression 14. At Step 77, the usual cursor is displayed at the new cursor position. The process ends. If an input is made from any key other than the keys for moving the cursors rightward and leftward, the process proceeds from Step 71 to Step 72 and from Step 72 to Step 73 whereat the system performs an operation required by the keyed-in signal and ends the process.

The cursor located at the top of the mathematical expression as shown (a) in FIG. 13 can be moved rightward by one digit every time when an input is made from the key for moving a cursor rightward. The cursor is thus moved rightward in succession as shown (b), (c), (d), (e), (f) and (g) in FIG. 13 and finally reaches the right end position (h) of the mathematical expression, at which an underline cursor is then displayed. The cursor can be moved leftward from the right end position (h) every time by pressing the key for moving the cursor rightward in the reverse steps as shown (g), (f), (e), (d), (c), (b) and (a) in FIG. 13.

With an input from the clear (CL) key, the buffer for storing a mathematical expression 14, the buffer for expanding a mathematical expression 15 and the buffer for expanding a value 16 are all initialized and store, respectively, an end code at the head position therein. With an input from the delete (DEL) key, the system deletes a key-in code (except for the end code), which is indicated by the pointer K in the buffer for storing a mathematical expression 14, and deletes at the same time a character string in the buffer for expanding a mathematical expression 15, which corresponds to the code deleted in the buffer for storing a mathematical expression 14. The pointers K, T and S (for buffer for expanding a value 16) are also moved to the corresponding positions. However, the process ends if the pointer K exists at the end code position.

With an input entered from a numeral key, a corresponding figure of the numeral is put at a position indicated by the pointer K in the buffer for storing a mathematical expression 14 unless the pointer K lies on an alphabetical character code. The figure is also inserted before the cursor in the buffer for expanding a mathematical expression 15. If the pointer K indicates an alphabetical character code in the buffer for storing a mathematical expression 14, the figure is inserted at the cursor position in the buffer for expanding a mathematical expression 15 and the variable-value is updated. The variable is displayed again if it was used twice and more.

Thus, the display mode of a mathematical expression can be changed-over to a variable-name display mode or a variable-value display mode by entering an input from the display-mode selecting key. This enables a user to easily refer to any variable-name and a corresponding variable-value in a mathematical expression on the display screen. It should be understood that the keyed-in inputs were described above by the way of example and are not limited thereto. A variety of keyed-in inputs other than the described keys can be realized and the number of variables can also be changed by modifying the keyboard 2 and changing items for the variable-value buffer (FIG. 5) and the character conversion table (FIG. 7).

[Second Embodiment]

Figure 15:
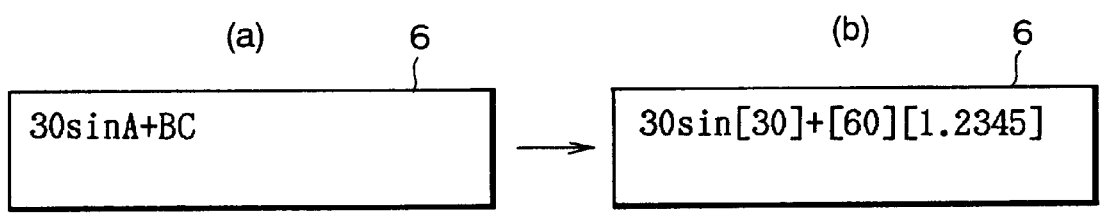
FIG. 15 shows an example of displaying a mathematical expression on a liquid-crystal display of the second embodiment of the present invention.

Referring to FIGS. 15 to 29, the second embodiment of the present invention will be described as follows:

In this embodiment, a LCD 6 can display each variable-value in brackets in a mathematical expression as shown (b) in FIG. 15 when a value displaying flag (not shown) is set ON.

Figure 16:
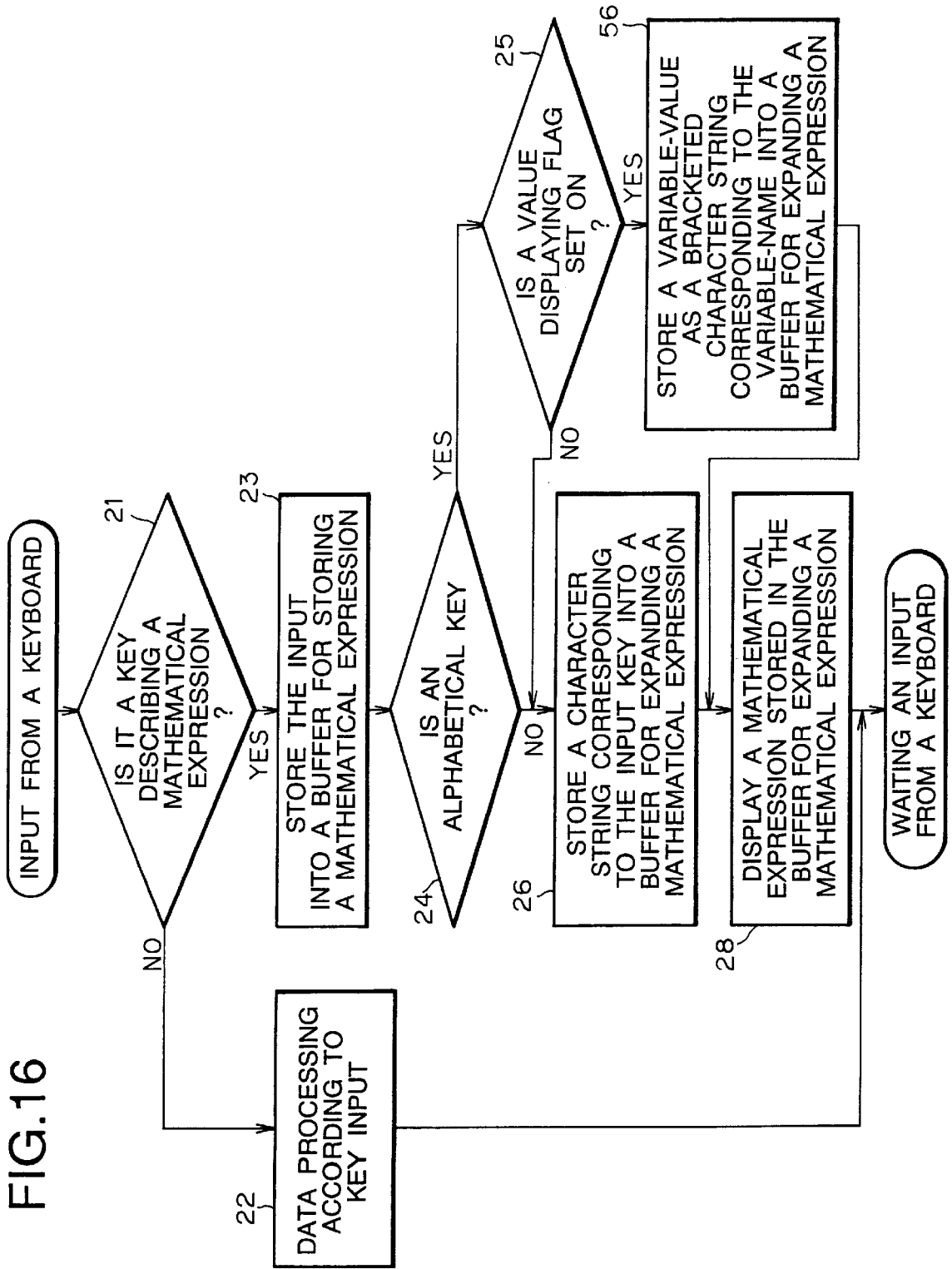
FIG. 16 is a flow chart describing an example of processing inputs from a keyboard for the second embodiment of the present invention.

The process for a keyed-in input is described by a flow chart shown in FIG. 16. This process is similar to the process described according to the flow chart of FIG. 8 but differs from the latter by Step 56 that puts each variable-value in brackets and stores it into a buffer for expanding a mathematical expression 15. In FIG. 16, components similar to those shown in FIG. 8 are given the same numerals and will not be explained further in detail.

Figure 17:
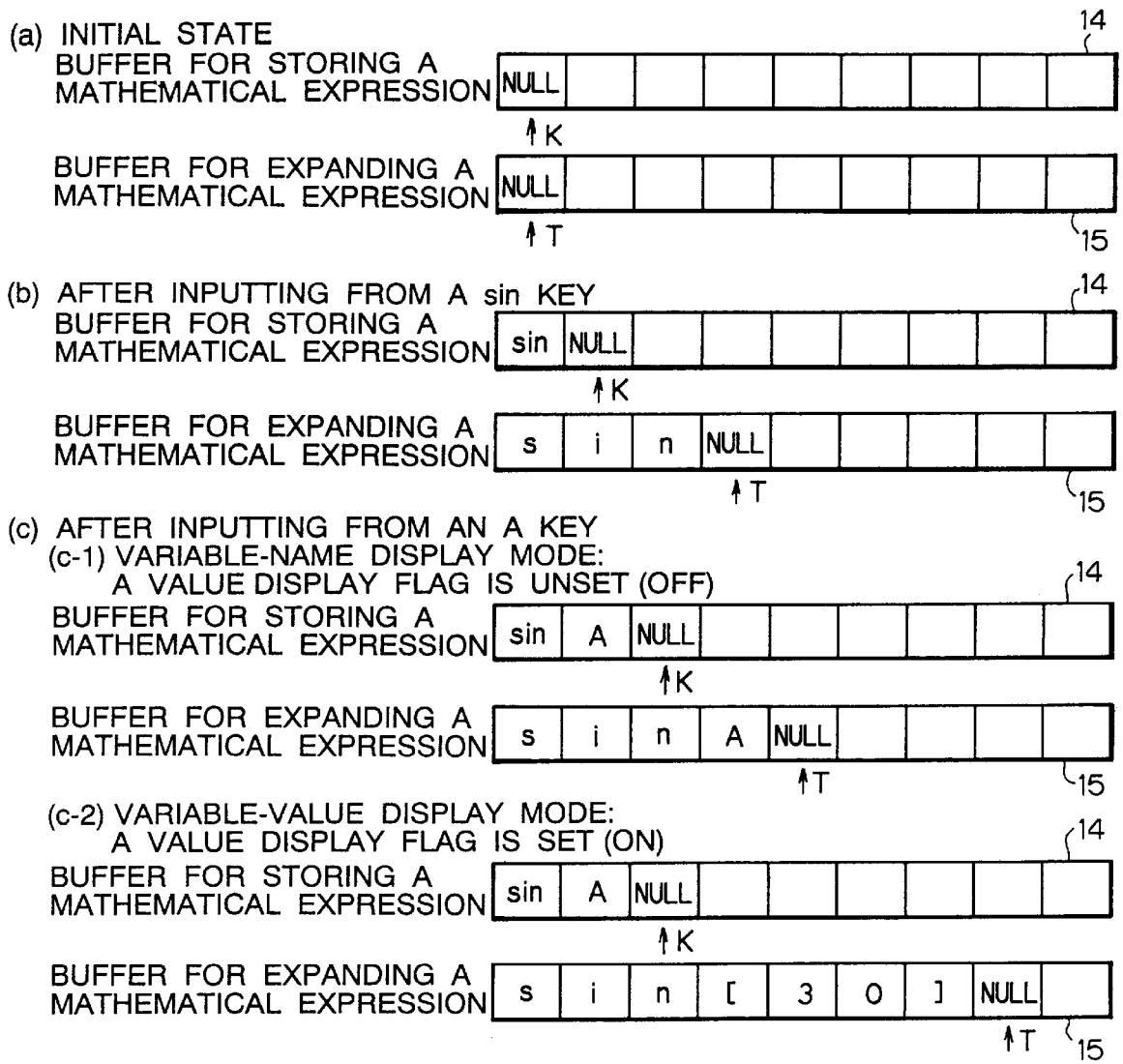
FIG. 17 is a view for explaining an example of processing by the second embodiment of the present invention.

The operation of the embodiment is described below by way of example with a keyed-in signal shown in FIG. 17. In this case, values for variables A, B, C, D and E are as shown in FIG. 5. The state of (a) in FIG. 17 shows initial states of a buffer for storing a mathematical expression 14 and a buffer for expanding a mathematical expression 15, which are indicated each by an end code located at the head position therein. With an input of a sin key describing a mathematical expression, the process advances from Step 21 to Step 23 for storing a key code of the sin key into the buffer for storing a mathematical expression 14.

As the sin key is not an alphabetical character key, the process advance from Step 24 to Step 26 whereat a character string "sin" corresponding to the sin key is stored into the buffer for expanding a mathematical expression 15. At Step 28, a mathematical expression formed in the buffer for expanding a mathematical expression 15 is displayed on the display screen and the process waits for a signal to be inputted from the keyboard. Thus, the key code of the sin key is stored in the buffer for storing a mathematical expression 14 and a character string "sin" is stored in the buffer for expanding a mathematical expression 15 as shown (b) in FIG. 17.

With an input of an A key, Steps 21, 23, 24 and 25 are performed in turn. At Step 25, it is judged whether the value displaying flag (not shown) is turned ON or not. The OFF-state of the value displaying flag means that the display works in the variable-name display mode, so the process proceeds to Step 26 for storing a character string "A" corresponding to the A key into the buffer for expanding a mathematical expression 15 whose content becomes as shown (c-1) in FIG. 17.

On the other hand, the ON-state of the flag means that the display works in the variable-value display mode. In this case, the process advances from Step 25 to Step 56 whereat a value corresponding to the variable-name A is read from the buffer for storing variable-value (FIG. 5) and a bracketed character string "30" is stored into the buffer for expanding a mathematical expression 15 whose content becomes as shown (c-2) in FIG. 17.

Figure 20B:
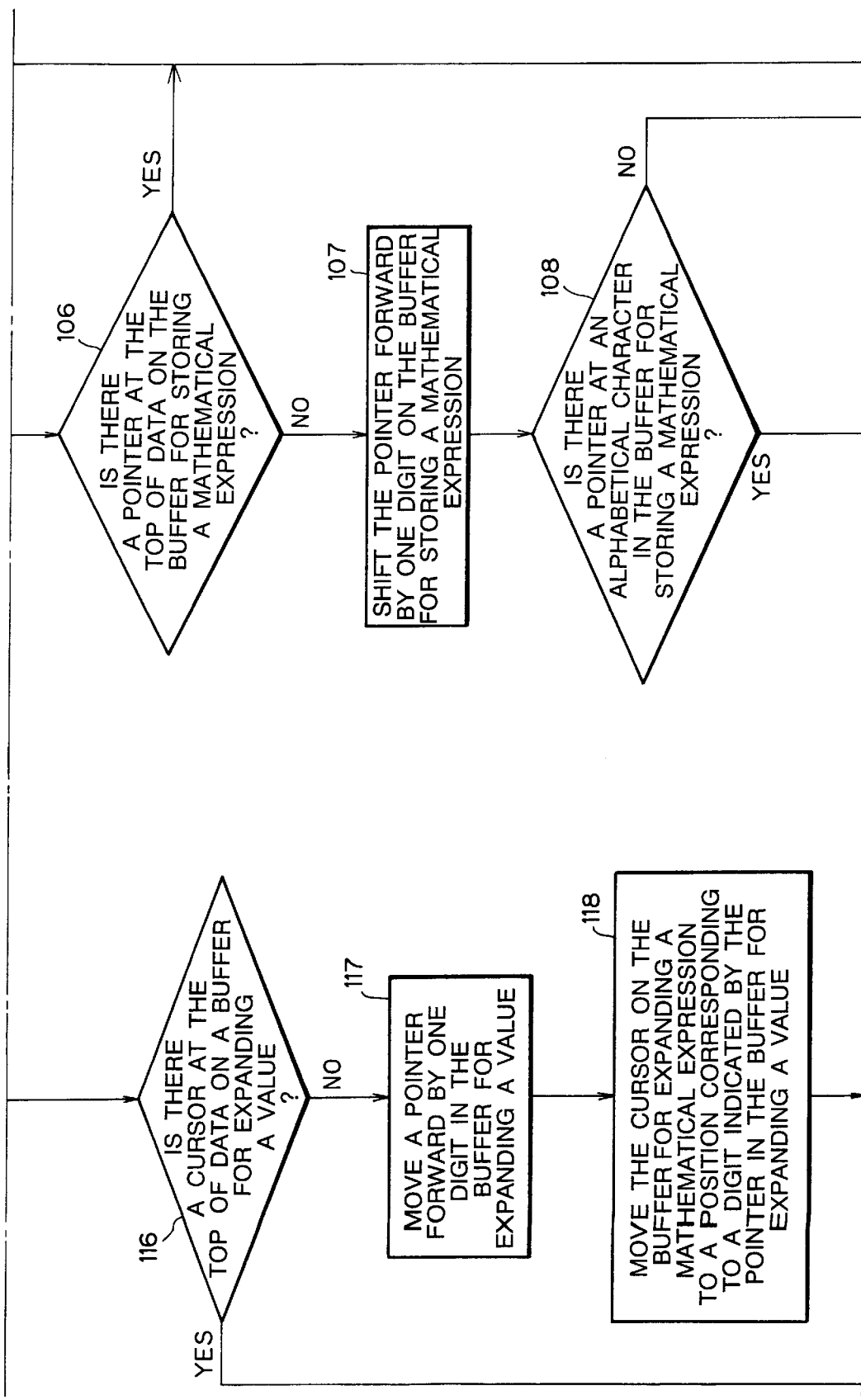

The inputting processes for variety of keyed-in signals are described as follows:

FIG. 19 is a flow chart describing procedures according to an algorithm to be performed for an input from a key for moving a cursor rightward while FIG. 20 is a flow chart describing procedures according to an algorithm to be performed for an input from a key for moving a cursor leftward.

Figure 18A:
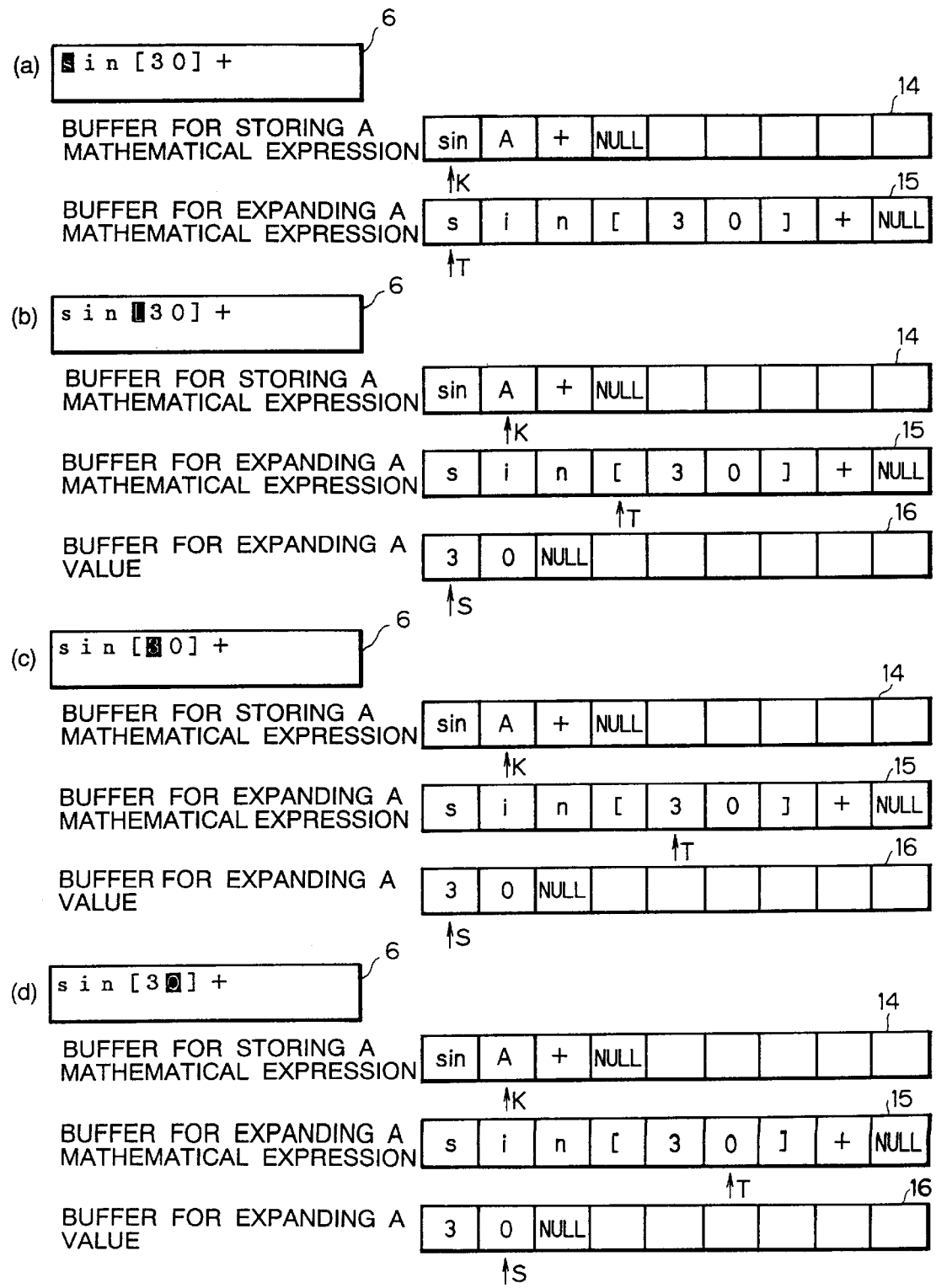
FIGS. 18A and 18B show an example of moving a cursor on a liquid-crystal display of the second embodiment of the present invention.
Figure 18B:
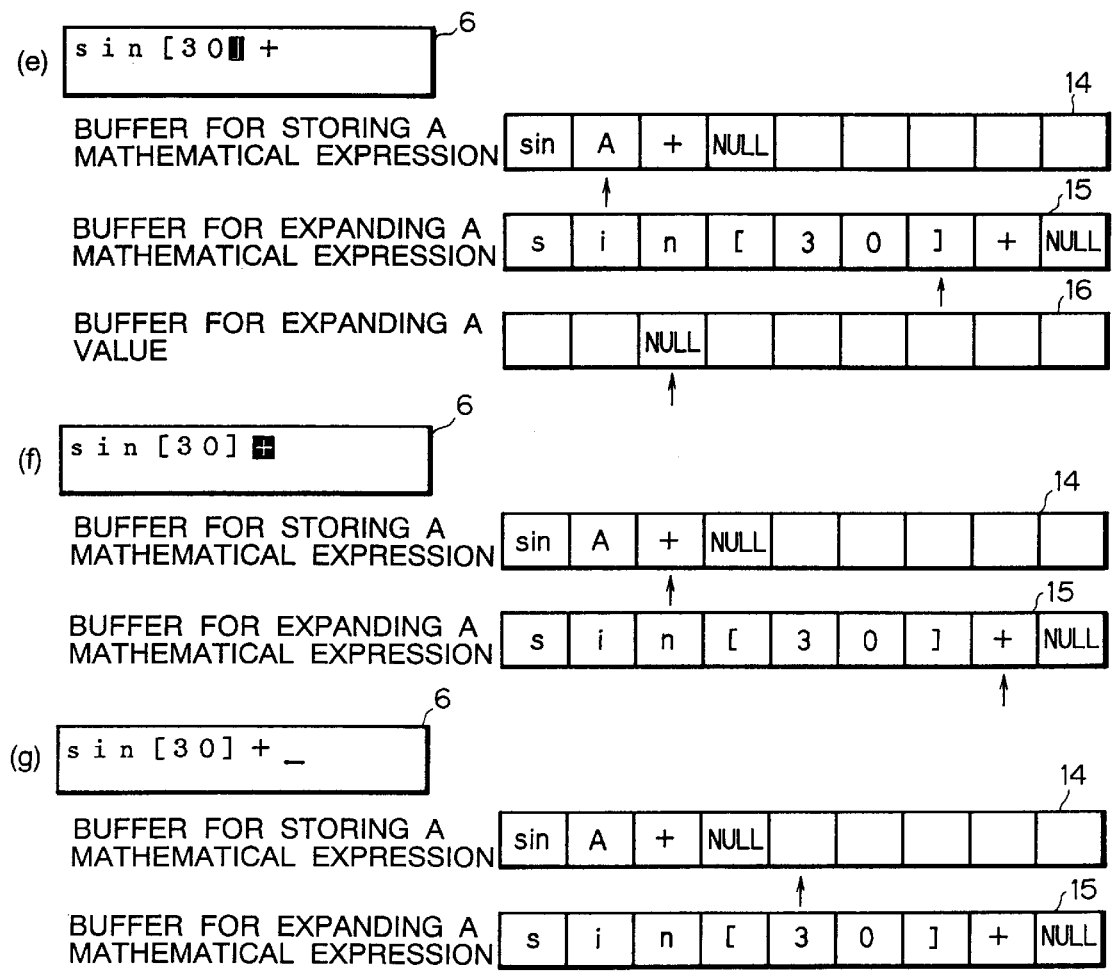

Referring to the flow chart of FIG. 19, an example of a process for moving a cursor on a display as shown in FIGS. 18A and 18B are described below:

The state of (a) in FIG. 18A shows an image on a screen of a LCD 6, where a sin key, an alphabetical character A key and a + key have been inputted in turn. A cursor is put at the head position on the display screen. A buffer for storing a mathematical expression 14 contains key codes sin, A and + and an end code in turn from the head position therein. With the value displaying flag (not shown) being ON, the variable-name A is converted to a corresponding variable-value that is then stored in a buffer for expanding a mathematical expression 15. Pointers K and T are located at the head positions in the buffers 14 and 15 respectively.

An algorithm described in terms of the flow chart of FIG. 19 is called-in for executing a command signal inputted from the key for moving a cursor rightward. At Step 85, it is judged whether the cursor is an underline or not. In the case (a) of FIG. 18A, the cursor is a usual (square block in the embodiment) cursor and hence the process proceeds to Step 86 whereat it is judged whether or not the pointer K indicates an alphabetical character in the buffer for storing a mathematical expression 14.

As shown (a) in FIG. 18A, the pointer K indicates the sin key code and hence the process advances to Step 89 whereat the pointer K is shifted backward by one digit in the buffer for storing a mathematical expression 14. The process proceeds to Step 90 whereat it is judged whether or not the shifted pointer K indicates an alphabetical character in the buffer for storing a mathematical expression 14. As the pointer K was shifted from the sin key code position to the character A position, the process proceeds to Step 91.

At Step 91, a variable-value corresponding to the variable-name A is stored as a character string "30" into the buffer for expanding a value 16. At Step 92, a pointer is placed at the head position in the buffer for expanding a value 16. At Step 93, the cursor is put on the left one of brackets wherein a variable-value is put. At Step 94, a usual cursor is displayed at the new position for the cursor and the process ends.

As shown (b) in FIG. 18A, the pointer K is moved forwards by one digit in the buffer for storing a mathematical expression 14, the pointer T is moved to a left bracket in the buffer for expanding a mathematical expression 15 and the pointer S indicates the top of a character string "30" stored in the buffer for expanding a value 16. A usual cursor (square block in the embodiment) indicates the left one of brackets enclosing therein the variable-value in the mathematical expression displayed on the LCD 6.

An algorithm for executing procedures described in terms of the flow chart of FIG. 19 is called for processing a subsequent input of the key for moving a cursor rightward. As shown (b) in FIG. 18A, the cursor is a usual (square block in the embodiment) cursor and hence the process advances from Step 85 to Step 86. As the pointer K indicates an alphabetical character in the buffer for storing a mathematical expression 14, the process advances from Step 86 to Step 87.

At Step 87, it is judged whether or not the pointer K indicates the end code in the buffer for expanding a value 16. As shown (b) in FIG. 18A, the pointer S indicates the head position (not end code) in the buffer for expanding a value 16 and hence the process proceeds to Step 95 whereat it is judged whether the cursor exists or not on the left bracket in the buffer for expanding a mathematical expression 15. As shown (b) in FIG. 18A, the cursor indicates the left bracket and therefore the process proceeds to Step 99 whereat the cursor is shifted backward by one digit in the buffer for expanding a mathematical expression 15.

The process further advances to Step 102 whereat the usual cursor is displayed at the new position and the process ends with it. Thus, the pointer K indicates the first character '3' in the character string "30" of the variable-value as shown (c) in FIG. 18A. The LCD 6 displays a mathematical expression wherein the cursor is displayed at the top of the variable-value in the brackets.

With a subsequent input of the key for moving a cursor rightward, the algorithm for executing procedures described by the flow chart of FIG. 19 is called again for processing the input. In this case, Steps 85, 86, 87 and 95 are performed in turn as described above. At Step 95, the absence of the cursor on the left bracket causes the process to proceed to Step 96 whereat the pointer S is shifted backward by one digit in the buffer for expanding a value 16.

At Step 97, it is judged whether or not the pointer S indicates the end code in the buffer for expanding a value 16. In the case (c) of FIG. 18A, the pointer S does not indicate the end code, so the process proceeds to Step 98 whereat the cursor in the buffer for expanding a mathematical expression 15 is moved to a position corresponding to a figure indicated by the pointer S in the buffer for expanding a value 16. The process further advances to Step 102 whereat it ens with displaying a usual cursor at the new position. The LCD 6 now displays a mathematical expression shown (d) in FIG. 18A.

With a further input of the key for moving a cursor rightward, the algorithm for executing procedures of the flow chart of FIG. 19 is called again. In this case, Steps 85, 86, 87, 95, 96 and 97 are performed in turn as described before. At Step 97, it is judged whether or not the shifted pointer S indicates the end code in the buffer for expanding a value 16.

In the case (d) of FIG. 18A, the pointer S is shifted to the end code and hence the process advances from Step 97 to Step 99 whereat the cursor is moved backward by one digit. At Step 102, a usual cursor is displayed at the new position in the buffer for expanding a mathematical expression 15. Consequently, the cursor is moved to the right bracket in the mathematical expression displayed on the LCD 6 as shown (e) in FIG. 18B. The pointer K indicates a keyed-in character A, the pointer T indicates the right bracket and the pointer S indicates the end code in the respective buffers.

With an input of the key for moving a cursor rightward in the state shown (e) in FIG. 18B, the algorithm represented by the flow chart of FIG. 19 is called again. In this instance, Steps 85, 86 and 87 are performed in the described order. As shown (e) in FIG. 18B, the pointer S indicates the end code in the buffer for expanding a value 16 and, therefore, the process advances from Step 87 to Step 88 whereat variable-values stored in the buffer for storing variable-values (FIG. 5) are updated and an updated mathematical expression is displayed.

At Step 89, the pointer K is moved backward by one digit and the process advances to Step 90. As the pointer K indicates the + key code, process proceeds to Step 100 whereat the cursor in the buffer for expanding a mathematical expression 15 is moved to the top of a character string corresponding to a code indicated by the pointer K in the buffer for storing a mathematical expression 14.

At Step 101, it is judged whether or not the cursor exists on the end code in the buffer for expanding a mathematical expression 15. In this case, the cursor indicates the + character and, therefore, the process advances to Step 102 whereat the usual cursor is displayed at a new position on the LCD as shown (f) in FIG. 18B.

With a subsequent input of the key for moving a cursor rightward, the algorithm expressed by the flow chart of FIG. 19 is called again for processing the input. In this instance, Steps 85, 86, 89, 90, 100 and 101 are performed in turn as described before. As the cursor has been shifted to the end code, the process proceeds to Step 103 whereat an underline cursor is indicated at a new position shown (g) in FIG. 18B.

With an input of the key for moving a cursor rightward in the state shown (g) in FIG. 18B, the algorithm for executing procedures described by the flow chart of FIG. 19 is called again. At Step 85, it is judged whether the cursor is an underline cursor or not. In this case, the process ends at once since the cursor is an underline.

An example of the processing operation of the system with successive inputs of a key for moving a cursor leftward will be described below according to a flow chart of FIG. 20. An example of moving a cursor on the display shown in FIGS. 18A and 18B are also applied but it must be read in this case in the reverse order since the cursor must be moved in the order of (g), (f), (e), (d), (c), (b) and (a) by repeating the process in response to subsequently keyed-in signals.

With an input from the key for moving the cursor leftward, the algorithm represented by the flow chart of FIG.

20 is called to be executed. At Step 104, it is judged whether or not the cursor is at the head position in the buffer for expanding a mathematical expression 15. In the case (g) of FIG. 18B, the cursor is absent at the head position in the buffer for expanding a mathematical expression 15 and hence the process proceeds to Step 105 whereat it is judged whether or not the pointer K indicates an alphabetical character in the buffer for storing a mathematical expression 14.

As the pointer K indicates the end code (not an alphabetical character), the process proceeds to Step 106 whereat it is judged whether or not the pointer K indicates the head position in the buffer for storing a mathematical expression 14. As shown (g) in FIG. 18B, the pointer K is absent at the head position in the buffer for storing a mathematical expression 14 and hence the process proceeds to Step 107 whereat the pointer K is moved forward by one digit in the buffer for storing a mathematical expression 14.

At Step 108, it is judged whether or not the pointer K indicates an alphabetical character in the buffer for storing a mathematical expression 14. As shown (g) in FIG. 18B, the pointer K was shifted to the + key code and hence the process advances to Step 113 whereat the cursor is shifted to the top of a character string in the buffer for expanding a mathematical expression 15, which character string corresponds to the code indicated by the pointer K in the buffer for storing a mathematical expression 14. The process then proceeds to Step 112 whereat a usual cursor is placed at a new position. The process ends with attaining the display screen image shown (f) in FIG. 18B.

With a subsequent input of the key for moving the cursor leftward in the state of the display shown (f) in FIG. 18B, the algorithm for executing procedures described by the flow chart of FIG. 20 is called again for processing the input. As the cursor does not indicate the head position in the buffer for expanding a mathematical expression 15, the process advances from Step 104 to Step 105. As the pointer K indicates the +key code in the buffer for storing a mathematical expression 14, the process further proceeds to Step 106. The pointer K does not indicate the head position in the buffer for storing a mathematical expression 14 and, therefore, the process proceeds to Step 107 whereat the pointer K is shifted forward by one digit in the buffer for storing a mathematical expression 14.

In the buffer for storing a mathematical expression 14 shown (f) in FIG. 18B, the pointer K is shifted from the + key code position to the alphabetical character A code position. At Step 108, it is judged whether the pointer K indicates the alphabetical character code or not. As the pointer K indicates the alphabetical character A, the process proceeds to Step 109 whereat a variable-value corresponding to the variable-name indicated by the pointer K is stored in terms of a character string into the buffer for expanding a value 16.

At Step 110, the pointer S is placed at the end code position in the buffer for expanding a value 16. At Step 111, the cursor is moved onto the right bracket before a character string in the buffer for expanding a mathematical expression 15. At Step 112, the usual cursor is displayed at a new position. The process ends with attaining the state shown (e) in FIG. 18B.

With a subsequent input of the key for moving a cursor leftward in the condition shown (e) in FIG. 18B, the programmed algorithm represented by the flow chart of FIG. 20 is called again to be executed. As shown (e) in FIG. 18B, the cursor does not indicate the head position in the buffer for expanding a mathematical expression 15 and hence the process advances from Step 104 to Step 105. As the pointer K indicates the head position in the alphabetical character in the buffer for storing a mathematical expression 14, the process proceeds to Step 114 whereat it is judged whether the cursor exists on the left bracket in the buffer for expanding a mathematical expression 15.

As shown (e) in FIG. 18B, the cursor is absent on the left bracket and, therefore, the process proceeds to Step 116 whereat it is judged whether or not the pointer S indicates the head position in the buffer for expanding a value 16. As the pointer S does not indicate the head position in the buffer for expanding a value 16, the process proceeds to Step 117 whereat the pointer S is advanced by one digit in the buffer for expanding a value 16. At Step 118, the cursor T in the buffer for expanding a mathematical expression 15 is shifted to a position corresponding to a figure indicated by the pointer S in the buffer for expanding a value 16. At Step 112, a usual cursor is indicated at a new position shown (d) in FIG. 18A.

With a further input of the key for moving the cursor leftward in the state of (d) in FIG. 18A, the algorithm for procedures of FIG. 17 is called again for processing the input. In this case, Steps 104, 105, 114, 116, 117, 118 and 112 are performed in turn as described before. Thus, the LCD 6 displays the image as shown (c) in FIG. 18A.

With a further input of the key for moving the cursor leftward in the state of (c) in FIG. 18A, the algorithm for procedures of FIG. 17 is called again for processing the input. In this case, Steps 104, 105, 114 and 116 are performed in turn as described before. As the pointer S indicates the head position in the buffer for expanding a value 16, the process advances from Step 116 to Step 119 whereat the cursor T is shifted onto the left bracket before a variable in the buffer for expanding a mathematical expression 15. At Step 112, a usual cursor is indicated on the above-mentioned position. Thus, the LCD 6 displays an image shown (b) in FIG. 18A.

With a subsequent input of the key for moving the cursor leftward in the state of (b) in FIG. 18A, the algorithm for executing procedures according to FIG. 17 is called again. In this case, Steps 104, 105 and 114 are performed in turn as described before. As the cursor is located on the left bracket in the buffer for expanding a mathematical expression 15, the process advances from Step 114 to Step 115 whereat the variable-values stored in the variable-value buffer (FIG. 5) are updated and an updated mathematical expression is displayed. The process proceeds to Step 106. As the pointer K does not indicate the head position in the buffer for storing a mathematical expression 14, the process proceeds to Step 107 whereat the pointer K is moved forward by one digit.

The pointer indicates the sin key code in the buffer for storing a mathematical expression 14 and does not indicate the alphabetic character, so the process advances from Step 108 to Step 113 whereat the cursor is moved to the top "s" of the character string "sin". At Step 112, a usual cursor is indicated at the new position, attaining the state shown (a) in FIG. 18A.

With a further input of the key for moving the cursor leftward in the state of (a) in FIG. 18A, the algorithm for procedures of FIG. 20 is called again for processing the input. The cursor exists on the head position in the buffer for storing a mathematical expression 14, so the process ends immediately after Step 104. Thus the display continues the state shown (a) in FIG. 18A.

Figure 21:
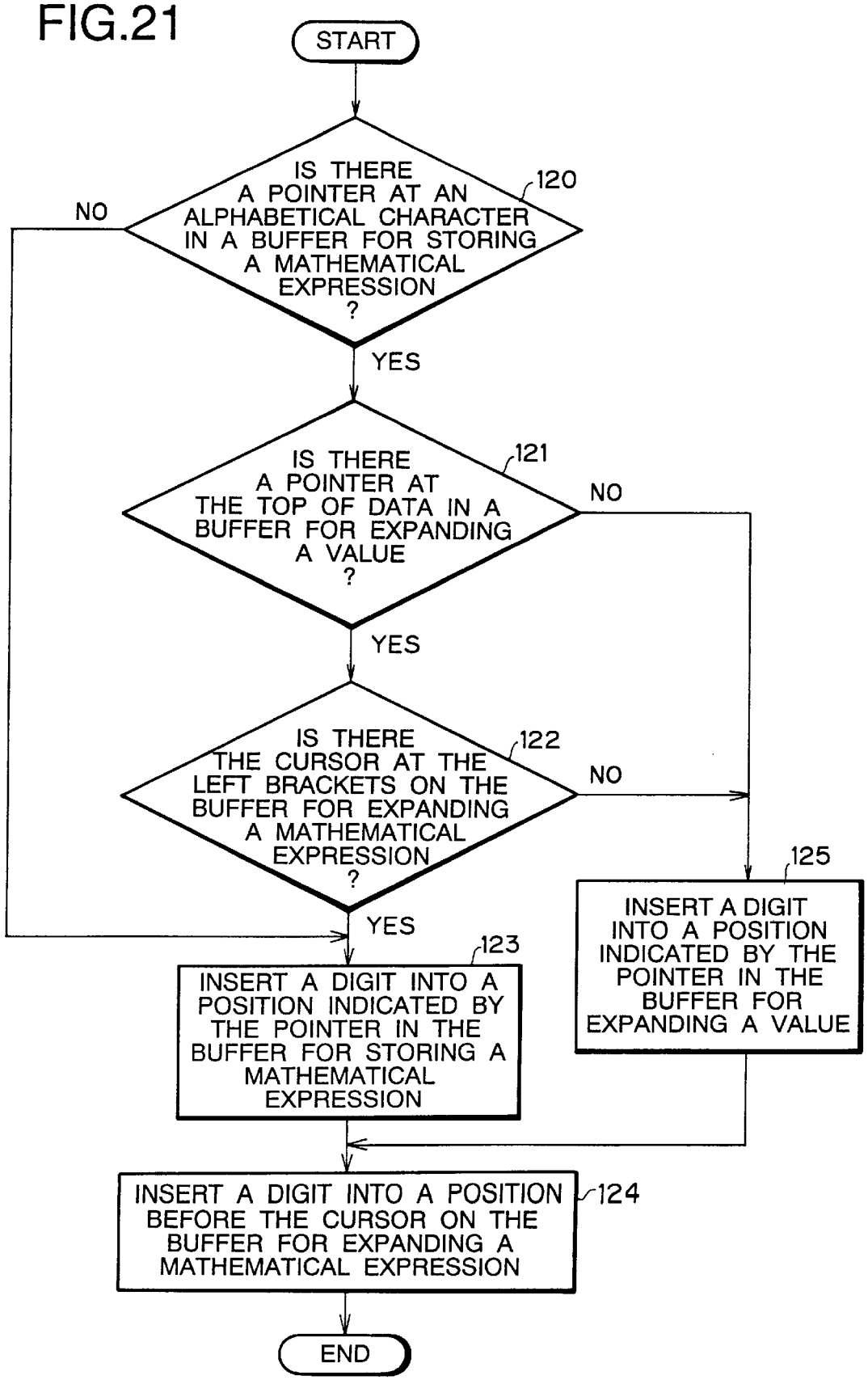
FIG. 21 is a flow chart showing an example of processing inputs from numeral-input keys for inputting numerals.

FIG. 21 is a flow chart describing procedures to be executed when a signal from any one of numeral keys is input. Referring to FIG. 21, the processing process is described with exemplified inputs of FIG. 22. The starting state shown (a) in FIG. 22 has been obtained by inputting signals from a sin key, a A key and a + key and by shifting a cursor onto a left bracket as described before. With an input of a numeral '2' key in the state shown (a) in FIG. 22, the algorithm represented by the flowchart of FIG. 21 is called for processing the input. At Step 120, it is judged whether or not a pointer K indicates an alphabetical character in a buffer for storing a mathematical expression 14.

As the pointer K indicates alphabetical character A (code of an A key), the process proceeds to Step 121 whereat it is judged whether or not a pointer S indicates the head position in a buffer for expanding a value 16. As shown (a) in FIG. 22, the pointer S exists at the ahead position in the buffer for expanding a value 16 and hence the process advances to Step 122 whereat or not a cursor exists on a left bracket in a buffer for expanding a mathematical expression 15. In this case, the cursor exists on the left bracket and, therefore, the process proceeds to Step 123 whereat a figure <2> is inserted into a place indicated by the pointer K in the buffer for storing a mathematical expression 14. The process advances to Step 124 whereat the figure <2> is inserted into a position before the cursor in the buffer for expanding a mathematical expression 15. The process ends with attaining the state shown (b) in FIG. 22.

An example of inputs shown (a) in FIG. 23 is described as follows:

The starting state shown (a) in FIG. 23 is such that keyed-in codes sin, A and + are stored in the buffer for storing a mathematical expression and a cursor is put on a character "0" of a character string "30" of a variable-value therein. An input is entered from a numeral key "6" in the above-mentioned starting state. The pointer K in the buffer for storing a mathematical expression indicates the alphabetical character and, therefore, the process advances from Step 120 to Step 121.

As a pointer S does not indicate the head position in a buffer for expanding a value 16, the process proceeds to Step 125 whereat a figure <6> is inserted into a position indicated by the pointer S in the buffer for expanding a value 16. At Step 124, a figure <6> is inserted into a position before the cursor in a buffer for expanding a mathematical expression 15. The display becomes into the state shown (b) in FIG. 23. If the cursor is absent on the left bracket in the buffer for expanding a mathematical expression 15, the process advances from Step 122 to Step 125.

Figure 24B:
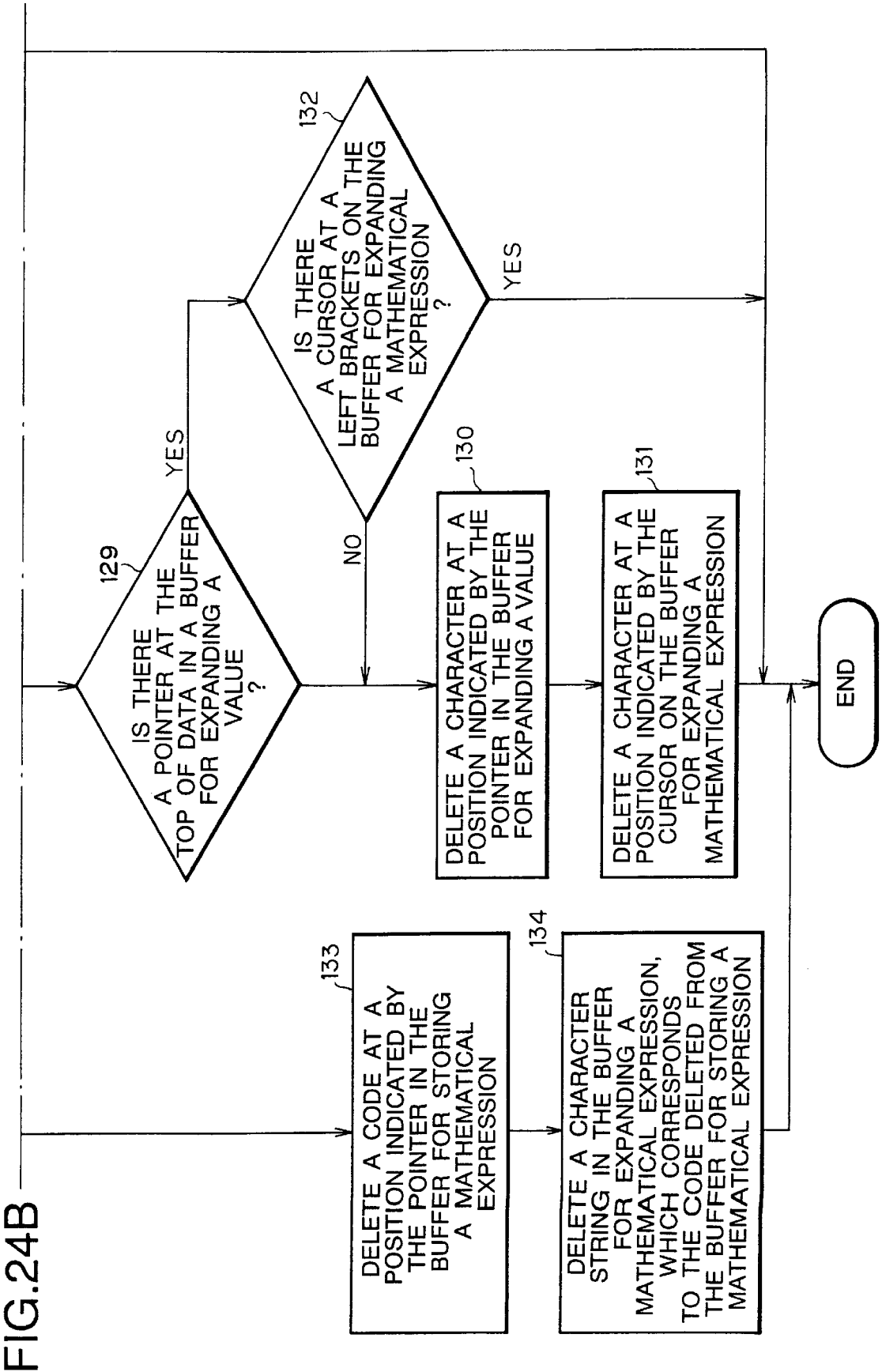

FIG. 24 is a flow chart describing a process to be executed when a signal from a delete (DEL) key is input. The process is described with an example of keyed-in inputs of FIG. 25, wherein a value 360 of a variable A must be changed to 60 by using the DEL key.

As shown (a) in FIG. 25, the cursor is moved onto the figure "3" of the character string "360" of the variable-value and then the DEL key is pressed to input a deleting command. This causes the algorithm represented by the flow-chart of FIG. 24 to be called. At Step 126, it is judged whether or not the pointer K indicates an end code in the buffer for storing a mathematical expression 14. As shown (a) in FIG. 26, the pointer K indicates the keyed-in character code A (not end code) and, therefore, the process proceeds to Step 127.

At Step 127, it is judged whether or not the pointer K indicates an alphabetic character in the buffer for storing a mathematical expression 14. As shown (a) in FIG. 25, the pointer K indicates an alphabetical character and, therefore, the process proceeds to Step 128 whereat it is judged whether or not the pointer S indicates the end code in the buffer for expanding a value 16. As shown (a) in FIG. 25, the pointer S does not indicate the end code, so the process proceeds to Step 129.

At Step 129, it is judged whether or not the pointer S indicates the head position in the buffer for expanding a value 16. As shown (a) in FIG. 25, the pointer S exists at the head position in the buffer for expanding a value 16 and, therefore, the process proceeds to Step 132 whereat it is judged whether the cursor exists on the left bracket in the buffer for expanding a mathematical expression 15. As shown (a) in FIG. 25, the cursor is absent on the left bracket and, therefore, the process proceeds to Step 130 whereat the character 3 indicated by the pointer S in the buffer for expanding a value 16.

At Step 131, the character 3 indicated by the cursor in the buffer for expanding a mathematical expression 15 is deleted. The process ends with attaining the state shown (b) in FIG. 25 where the figure "3" in the character string "360" is deleted and a desired variable-value 60 is indicated in the mathematical expression on the LCD. Thus any variable-value can be changed by using the cursor-moving keys, numeral keys and delete (DEL) key.

Figure 26:
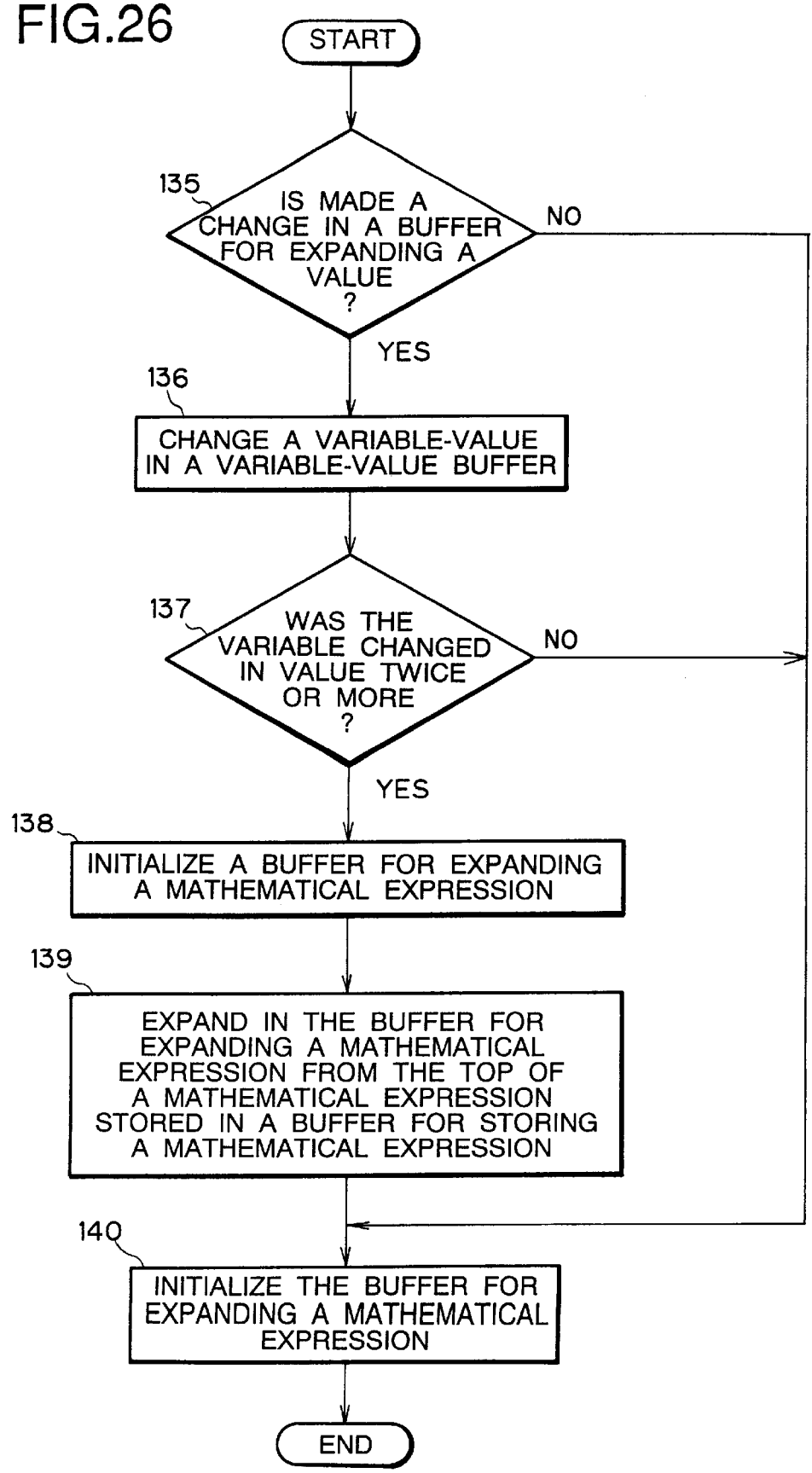
FIG. 26 is a flow chart describing an example of processing with a cursor placed out of an area of editing a variable-value.

At Step 88 in FIG. 19 as well as at Step 115 in FIG. 20, a variable-value is updated and a mathematical expression is indicated if the cursor moves out of a bracketed variable-value editing-area. A flow chart for this purpose is shown in FIG. 26. When the cursor moves out of the variable-value editing area, an algorithm represented by the flow chart shown in FIG. 26 is called-in. At Step 135, a content of the buffer for expanding a value 16 is compared with variable-values stored in the buffer for storing variable-value (FIG. 5) to judge whether the content of the buffer for expanding a value 16 is changed or not.

If the content of the buffer for expanding a value 16 was not changed, the buffer for expanding a value 16 is initialized at Step 140 and the process ends. If the content of the buffer for expanding a value 16 was changed, the changed value in the buffer for storing variable-value (FIG. 5) is updated at Step 136 and it is examined whether or not the variable changed in its value is used not less than twice in the mathematical expression.

If the variable was not used twice or more, the buffer for expanding a value 16 is initialized at Step 140 and then the process ends. If the variable was used twice or more, the process advances from Step 137 to Step 138 whereat the buffer for expanding a mathematical expression 15 is initialized. At Step 139, the mathematical expression stored in the buffer for storing a mathematical expression 14 is expanded from its top into the buffer for expanding a mathematical expression 15. Then, the buffer for expanding a value 16 is initialized at Step 140.

Figure 27:
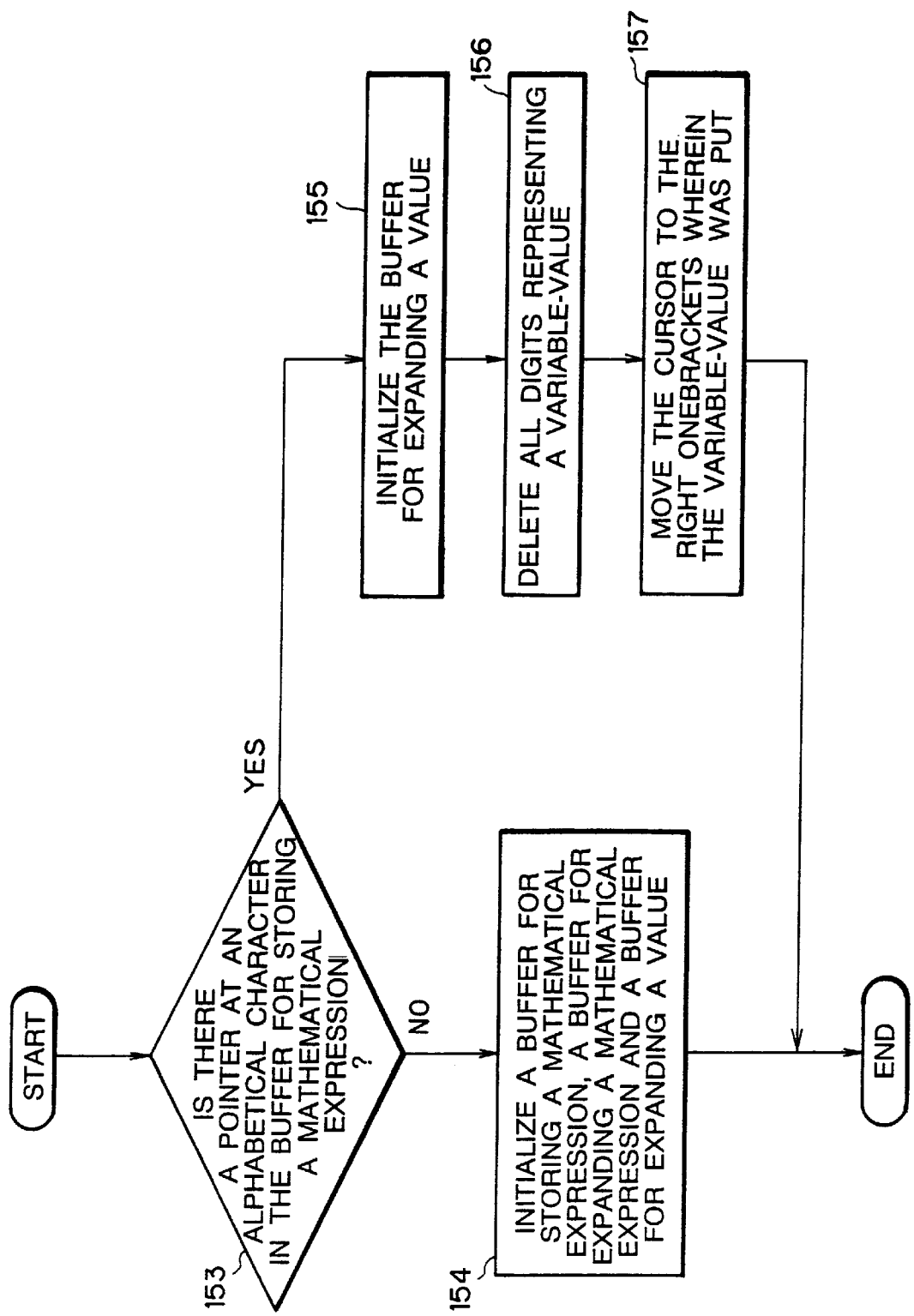
FIG. 27 is a flow chart describing an example of processing an input from a CL (clear) key for replacing data with a blank.
Figure 28:
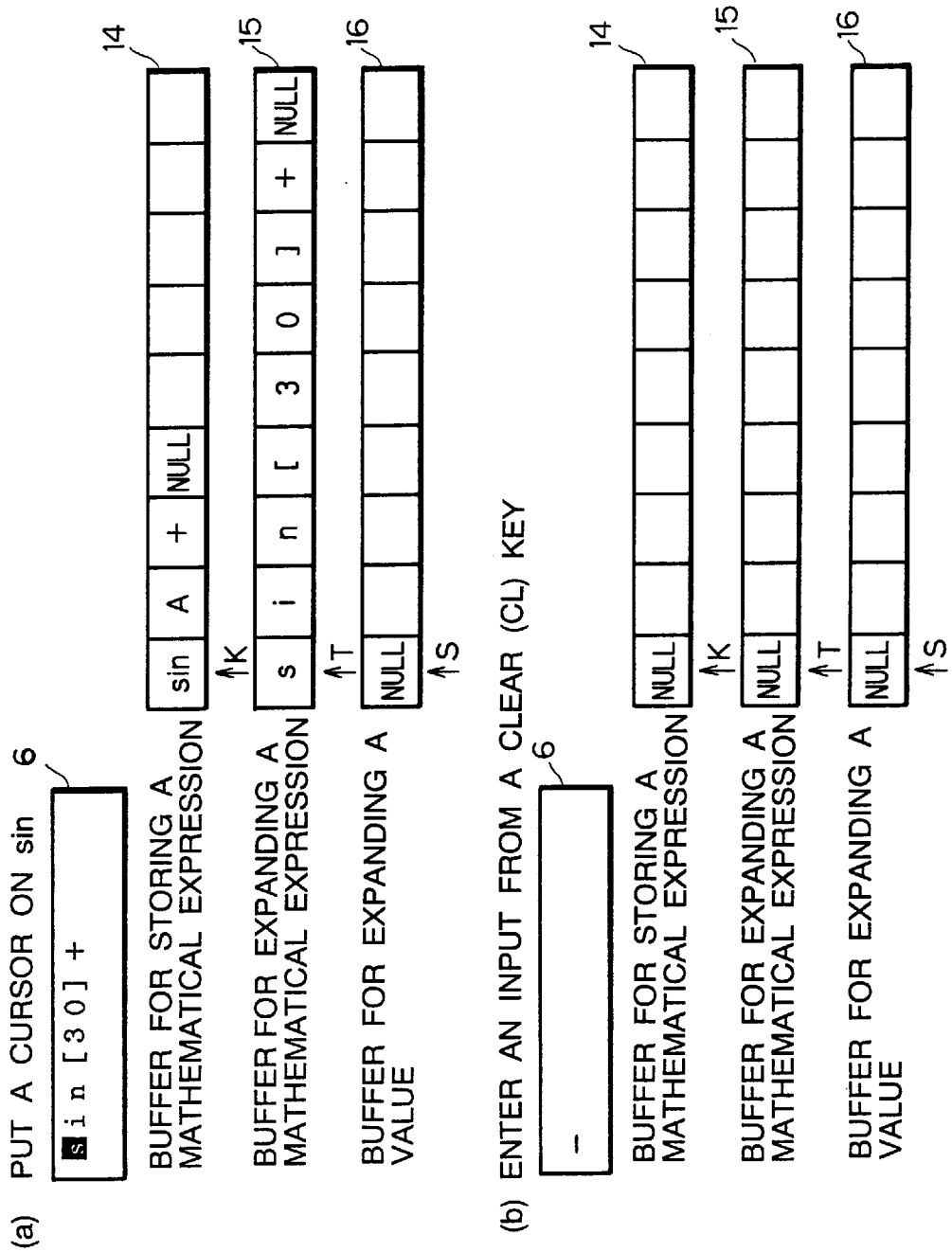
FIG. 28 is a view for explaining an example of data-clearing processing.

FIG. 27 is a flow chart by an algorithm to be executed for an input entered from the clear (CL) key. The processing process is described below with an example of inputs shown in FIG. 28:

The process starts from a state of (a) in FIG. 28 where inputs from a sin key, a character A key and a + key are displayed in turn with a cursor put on the sin code.

When a signal from the clear (CL) key is input in the state of (a) in FIG. 28, the processing algorithm represented by the flow chart of FIG. 27 is called to be executed. At Step 153, it is judged whether or not a pointer K indicates an alphabetical character in a buffer for storing a mathematical expression 14. As shown (a) in FIG. 28, the pointer K indicates the sin code (not the alphabetical character) and, therefore, the process proceeds to Step 154 whereat the buffer for storing a mathematical expression 14, a buffer for expanding a mathematical expression 15 and a buffer for expanding a value 16 are all initialized. The process ends with attaining the state shown (b) in FIG. 28.

The process to be executed for an input of the clear (CL) key is described in the case of an exemplified inputs shown in FIG. 29.

In the state of (a) in FIG. 29, a cursor is placed on a bracketed variable-value [3], then a signal from the clear (CL) key is input. A pointer K indicates an alphabetical character and, therefore, the process advances from Step 153 to Step 155 in FIG. 27.

At Step 155, a buffer for expanding a value 16 is initialized. At Step 156, all figures (digits) representing variable-values are cleared in the buffer for expanding a mathematical expression 15. At Step 157, the cursor is replaced onto a right one of brackets in which the variable-value was put. The process ends with attaining the state shown (b) in FIG. 29.

Thus, the variable-value is put in brackets that separate the value from other codes. This enables each variable-value to be much easily readable on the display screen as compared with the display of the first embodiment. Bracketing is particularly effective to display subsequently inputted variable-values which can be separated from each other by brackets. The second embodiment differs from the first embodiment by the method of using cursor-moving keys for displaying bracketed variable-values on the display screen.

[Third embodiment]

Figure 31:
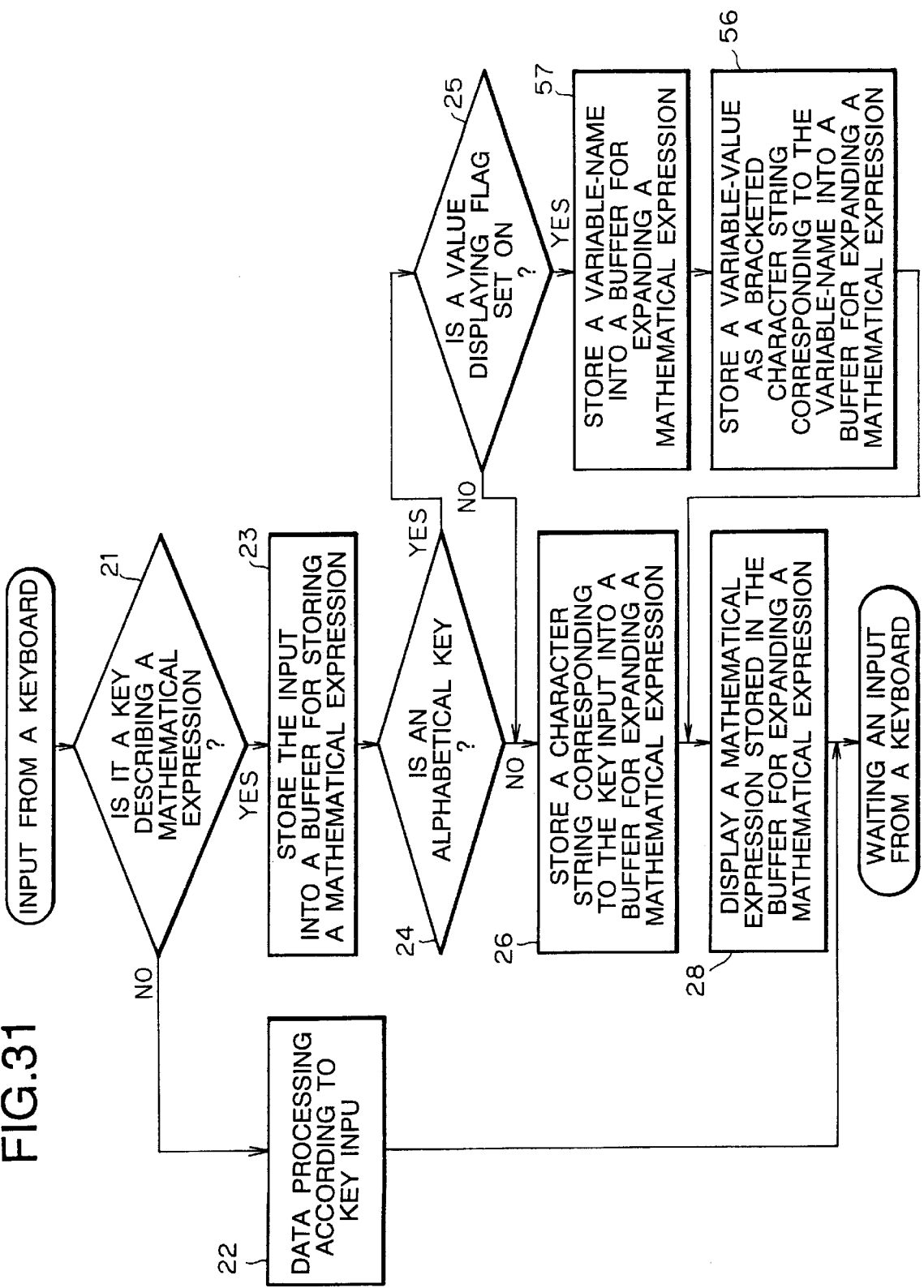
FIG. 31 is a flow chart describing an example of processing inputs from a keyboard of the third embodiment of the present invention.
Figure 32:
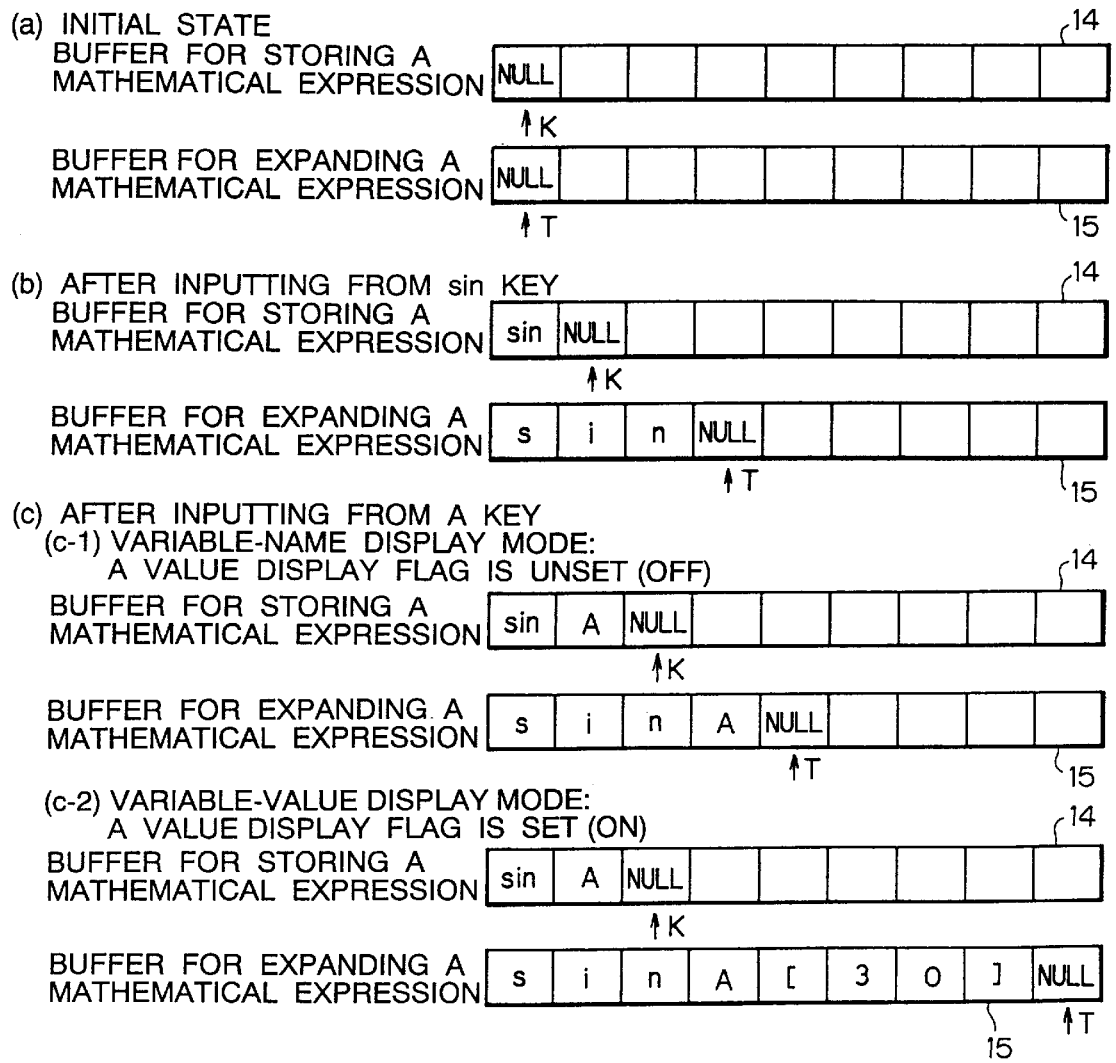
FIG. 32 is a view for explaining an example of processing by the third embodiment of the present invention.

Referring to FIGS. 30 to 32, a third embodiment of the present invention will be described as follows:

This embodiment is similar in construction to the second embodiment. However, this embodiment can display both variable-name and variable-value on a liquid crystal display (LCD) 6 as shown (b) in FIG. 30 when it works with a value displaying flag being set (ON). The state of (a) in FIG. 30 shows a screen image of the LCD 6 when the embodiment works with the value displaying flag being unset (OFF). In this case, the above-mentioned process is partly changed. FIG. 31 is a flow chart for processing for keyed-in input. In FIG. 31, components similar in function to those shown in FIG. 17 are given the same numerals and further explanation about them is omitted. The flow chart of FIG. 31 differs from the flow chart of FIG. 17 by providing a process of Step 57 for storing a variable-name in a buffer for expanding a mathematical expression 15 before Step 56.

An example of keyed-in inputs shown in FIG. 32 is applied for the process according to the flow chart. The process is described for inputs of sin and A keys, which is made in the initial state of (a) in FIG. 32 where an buffer for storing a mathematical expression 14 and an buffer for expanding a mathematical expression 15 are shown each with an end code NULL stored at the head position therein. When a signal from the sin key is input, Steps 21, 23, 26 and 28 are performed in turn (as described in FIG. 17) to attain state of (b) in FIG. 32. With a subsequent input from the A key, the Steps 21, 23, 24, 25, 26, 28 are executed in turn as described before, if a value displaying flag (not shown) is unset (OFF). The state of (c-1) in FIG. 32 is obtained as the result of the process.

On the other hand, Steps 21, 23, 24 and 25 (FIG. 31) are performed in turn if the value displaying flag (not shown) is set (ON). Since the value displaying flag is ON, the process advances from Step 25 to Step 57 whereat a variable-name A is stored into a buffer for expanding a mathematical expression 15. At Step 56, a variable-value corresponding to the variable-name is stored as a bracketed character string "30" into buffer for expanding a mathematical expression 15. Consequently, the name and the value of the variable are stored in the buffer for expanding a mathematical expression 15 and displayed (at Step 28) as shown (c-2) in FIG. 32. This feature enables a user to immediately recognize variable-name and value indicated at a time in a mathematical expression while inputting the latter if the value displaying flag is set (ON).

[Fourth Embodiment]

Figure 33:
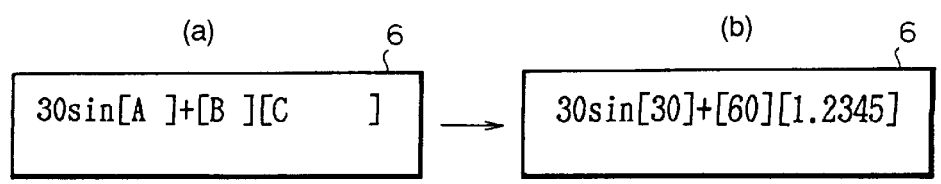
FIG. 33 shows an example of data displayed on a liquid-crystal display of a fifth embodiment of the present invention.
Figure 35:
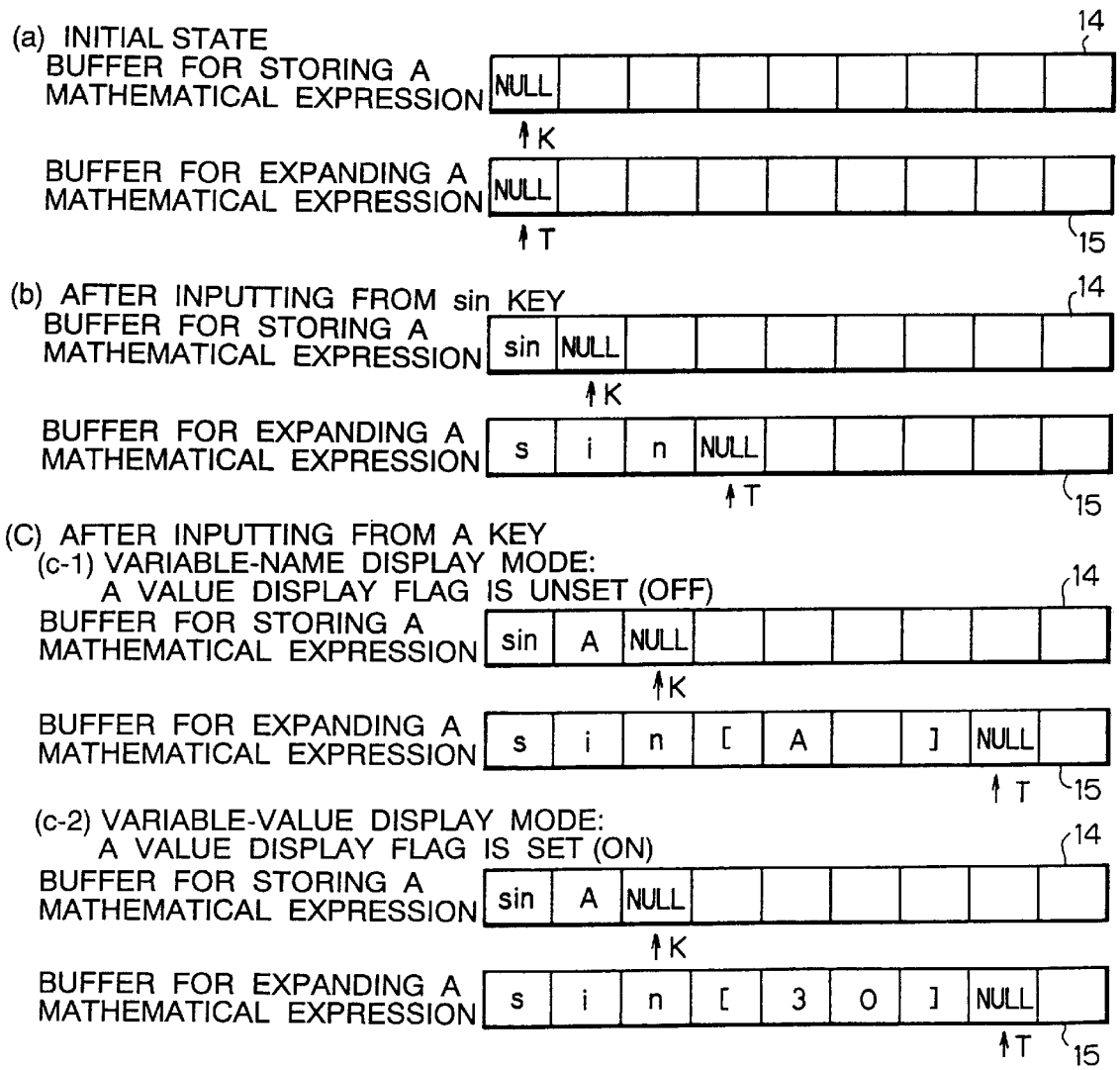
FIG. 35 is a view for explaining an example of processing by the fifth embodiment of the present invention.

Referring to FIGS. 33 to 35, a fourth embodiment of the present invention will be described as follows: This embodiment is similar in construction to the second embodiment. However, this embodiment can display variable-names in respective bracketed areas necessary for displaying respective variable-values as shown (a) in FIG. 33 when the value displaying flag is unset (OFF). This enables a user to easily read variable-values instead of the names in respective bracketed areas without any change in size and arrangement of the mathematical expression on a LCD 6 as shown (b) in FIG. 33 by inputting a signal from a display-mode selecting key to set the value displaying flag.

FIG. 34 is a flow chart representing a processing algorithm to be executed in response to keyed-in inputs in the present embodiment. In FIG. 34, the components similar in function to those of the second embodiment shown in FIG. 16 are given the same numerals and will not explained further in detail. The operation of this embodiment is also described with reference to exemplified keyed-in inputs of FIG. 35. The initial state is shown (a) in FIG. 35 where a buffer for storing a mathematical expression 14 and a buffer for expanding a mathematical expression 15 contains each an end code NULL in the head position therein.

When a signal from a sin key is input, the process according to the flow chart of FIG. 34 advances from Step 21 to Step 23 since the sin key is a key for describing a mathematical expression. At Step 23, a keyed-in code sin is stored into a buffer for storing a mathematical expression 14. At Step 24, it is judged whether or not the code is an alphabetical character. As the sin code is not an alphabetical character, the process proceeds to Step 26 whereat a character string corresponding to the input key is stored into the buffer for expanding a mathematical expression 15.

At Step 28, a mathematical expression stored in the buffer for expanding a mathematical expression 15. As shown (b) in FIG. 35, the buffer for storing a mathematical expression 14 contains the sin key code and the buffer for expanding a mathematical expression 15 contains the corresponding character string "sin". With a subsequent input from a character A key, the algorithm represented by the flow chart of FIG. 34 is called-in for processing the input. Steps 21, 23 and 24 are performed in turn. As the input key is an alphabetical character, the process advances from Step 24 to Step 25.

With a value displaying flag (not shown) being unset (OFF), the process proceeds to Step 58 to determine the number n of figures of the variable-value to be displayed. For example, n-2 if a variable A is 30. At Step 59, a right bracket is stored into the buffer for expanding a mathematical expression 15. At Step 60, the variable-name and (n-1) pieces of blank spaces are stored into the buffer for expanding a mathematical expression 15. At step 61, a left bracket is stored into the buffer for expanding a mathematical expression 15. At Step 28, a mathematical expression written in the buffer for expanding a mathematical expression 15 is displayed. The process goes into a state waiting for another input. Thus, the buffer for expanding a mathematical expression 15 has blanks necessary for displaying the variable-name A and the variable-value 30 as shown (c-1) in FIG. 35. The variable-name A is also indicated.

On the other hand, in case when a value displaying flag (not shown) is set (ON), the process advances from Step 25 to Step 27 whereat the variable-value corresponding to the alphabetical character (variable-name) is stored as a character string into the buffer for expanding a mathematical expression 15. Thus, the buffer for expanding a mathematical expression 15 contains bracketed variable-value as shown (c-2) in FIG. 35. The comparison between (c-1) and (c-2) in FIG. 35 indicates that both buffers for expanding a mathematical expression 15 have the same number of characters of the character string. This means that the mathematical expression may not change its format and arrangement by changing the display mode (as shown (a) and (b) in FIG. 35), assuring easy readability and recognition of both parameters.

[Fifth Embodiment]

Figure 36B:
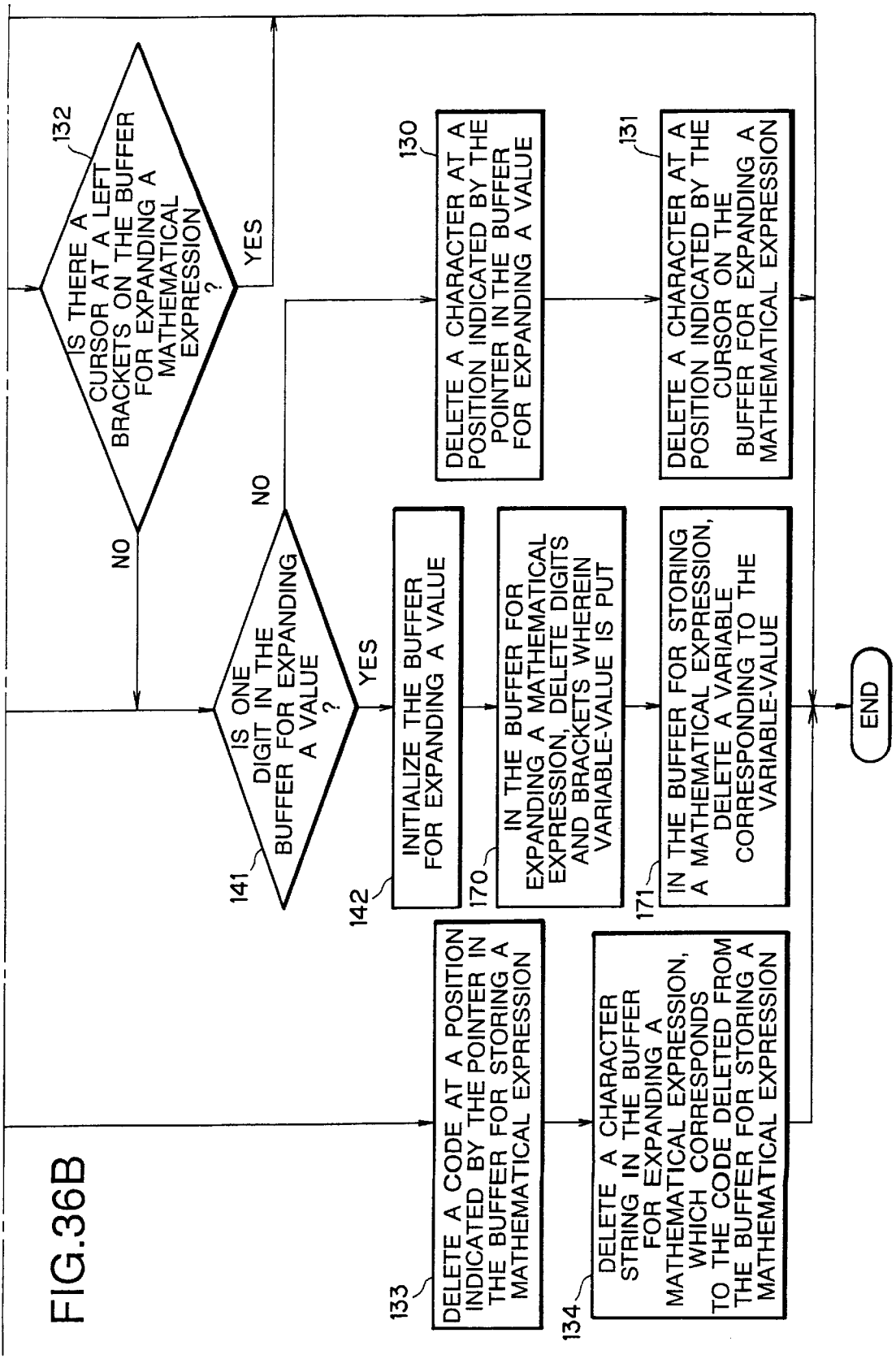

Referring to FIGS. 36 to 37, the fifth embodiment of the present invention will be described below:

This embodiment is similar in construction to the second embodiment. However, this embodiment includes a modified method of deleting data by using a delete (DEL) key. When deleting a figure in the buffer for expanding a value 16 by inputting a signal from the delete (DEL) key, a value is first examined to be one digit or not and one digit variable is deleted. FIG. 36 is a flow chart describing a process for this purpose. In FIG. 36, components similar in function to those shown in FIG. 24 are given the same numerals and will not be explained further in detail.

The operation of this embodiment is also described with reference to exemplified keyed-in inputs of FIG. 37. A state shown (a) in FIG. 37 shows a state that contains key-codes of a sin key, an A key and a + key. A variable-value A is 3. A cursor is moved and set on the variable-value "3" by using a cursor-moving key, then the delete (DEL) key is pressed to input a delete command signal.

The algorithm represented by the flow chart of FIG. 36 is called to execute the keyed-in command signal as follows:

As a pointer K does not indicate an end code in a buffer for storing a mathematical expression 14, the process advances from Step 126 to Step 127. As the pointer K indicates an alphabetical character in the buffer for storing a mathematical expression 14, the process proceeds to Step 129.

As a pointer S indicates the head position, the process proceeds to Step 132. As the pointer T does not indicate a left bracket, the process proceeds to Step 141. At Step 141, it is examined whether the value in the buffer for expanding a value 16 is a one-figure value or not. As shown (a) in FIG. 37, the value consists of one figure, the process proceeds to Step 142.

At Step 142, the buffer for expanding a mathematical expression 15 is initialized. At Step 170, the figure and brackets in which variable-value was put are deleted in the buffer for expanding a mathematical expression 15. At Step 171, the variable in the buffer for storing a mathematical expression 14, which corresponds to the variable-value in the buffer for expanding a mathematical expression 15, is deleted. The process ends. Thus, the buffer for expanding a value 16 is initialized and the buffer for storing a mathematical expression 14 is put into the state the variable A was deleted therefrom. Deletion of variables can be realized quickly.

When the value in the buffer for expanding a value 16 was judged at Step 141 not to be one figure, the process proceeds to Step 130 whereat the character indicated by the pointer S is deleted and then proceeds to Step 131 whereat the character indicated by the pointer T in the buffer for expanding a mathematical expression 15.

[Sixth Embodiment]

Figure 38:
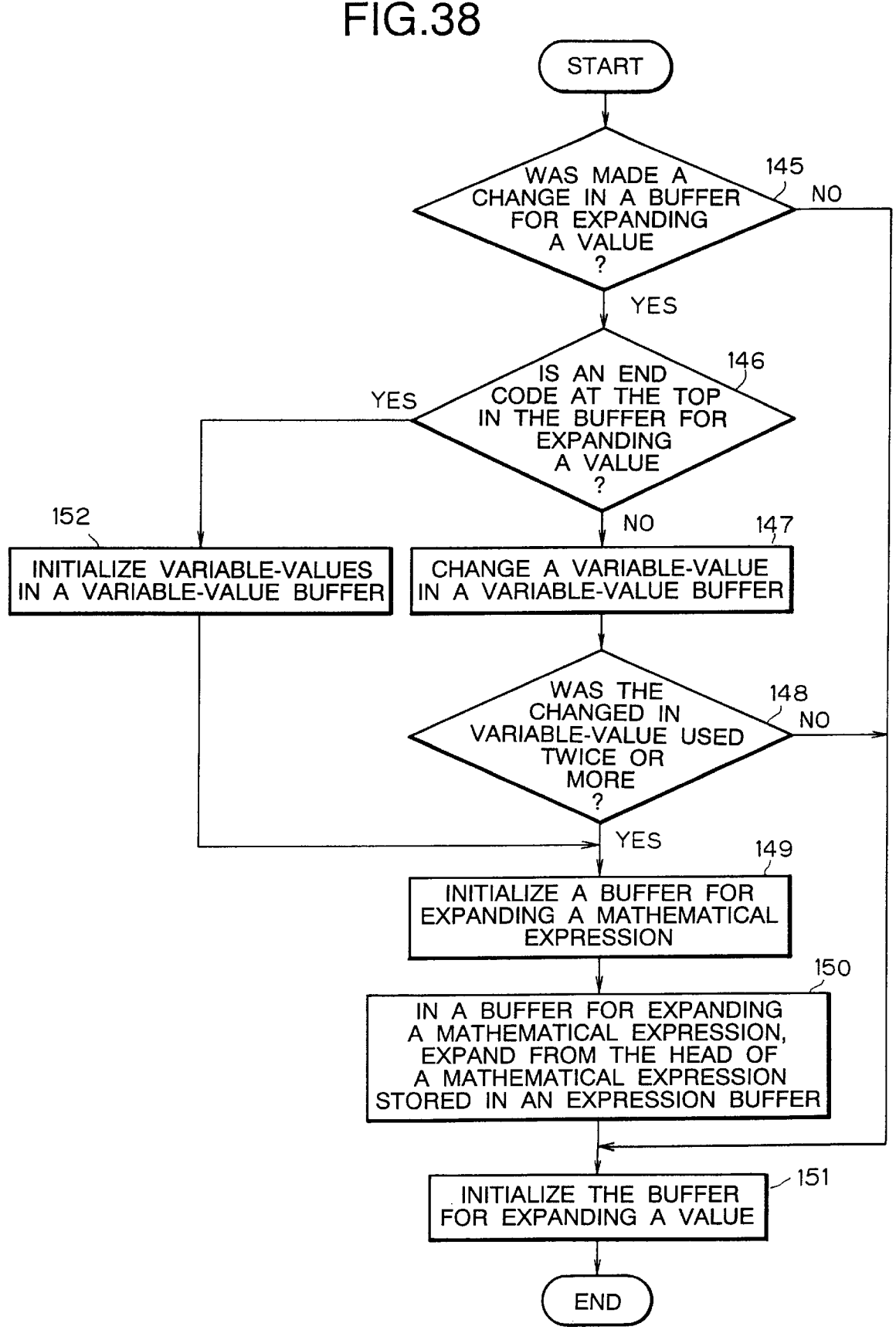
FIG. 38 is a flow chart describing an example of processing an input from a CL (clear) key for replacing data by a blank in a sixth embodiment of the present invention.

Referring to FIGS. 38 to 39, a sixth embodiment of the present invention will be described as follows: This embodiment is similar in construction to the second embodiment, but it is featured by the process of updating a variable-value and renewing the mathematical expression when a cursor gets out of a variable-value displaying area. FIG. 38 is a flow chart describing the above-mentioned processing operation, which is explained below with exemplified inputs of FIG. 39. This processing flow chart corresponds to the flow chart (FIG. 39) of the second embodiment.

The state of (a) in FIG. 39 shows the state that signals from keys sin, A and + have been inputted. A cursor is moved onto a variable-value "3" by using a cursor-moving key and then an input from a delete DEL key is entered. This causes the display to display no variable-value as shown (b) in FIG. 39. No particular process is conducted since any variable-value can be still inputted. When the cursor was moved onto the sign + by using a key for moving the cursor rightward, it got out of the variable-value editing area that calls the programmed algorithm for executing procedures described by the flow chart of FIG. 38.

In FIG. 38, it is decided whether or not the buffer for expanding a value 16 was changed at Step 145. In FIG. 39, the variable-value is changed and, therefore, the process proceeds to Step 146 whereat it is decided whether or not the end code exists at the head position in the buffer for expanding a value 16. As shown (b) in FIG. 39, the end code is at the head position in the buffer for expanding a value 16 and, therefore, the process proceeds to Step 152 whereat the value of the variable A in the buffer storing variable-values (FIG. 5) is initialized into Zero.

Next, at Step 149, the buffer for expanding a mathematical expression 15 is initialized and, then, at Step 150, the mathematical expression in the buffer for storing a mathematical expression 14 is expanded successively from its top into the buffer for expanding a mathematical expression 15. The process initializes, at Step 151, the buffer for expanding a value 16 and ends. Thus, all character strings representing variable-values were deleted and, therefore, the LCD 6 displays a mathematical expression with zero of the initialized variable-value.

In the flow chart of FIG. 38, the process proceeds to Step 151 if the buffer for expanding a value 16 was not changed at Step 145. If an end code was absent at the head position in the buffer for expanding a value 16 at Step 146, the process proceeds to Step 147 whereat the variable-values in the buffer for storing variable-values (FIG. 5) are updated. Next, at Step 148, it is decided whether or not the variable changed its value is used not less than twice. If it was used twice or more, the process proceeds to Step 149. If the variable was not used twice or more, the process proceeds to Step 151. Thus, all character strings of variable-values are deleted when the cursor moved out of the variable-value display area.

The present invention according to the foregoing description brings advantages described below:

(1) Variables contained in a mathematical expression can be substituted by corresponding variable-values by conversion means. Thus, the mathematical expression with values put in place of variables are displayed on a liquid-crystal display, eliminating the necessity of recognizing variable-values. There is no need for switching from normal calculation mode to special calculation mode. The display screen has a small size but can display variable-values in a mathematical expression, improving operating facility.

(2) Display mode selecting means can change the display mode of the LCD to display a variable-name or variable-value. This makes it easier to recognize a variable-name and corresponding variable-value. The display has a small-size screen whereon variables can be displayed in terms of name code or value by selectively changing over the display mode.

(3) The displaying method enables a user to enter a mathematical expression while recognizing values substituted for corresponding variables on the display screen.

(4) Each variable is bracketed to separate from other components in the mathematical expression as well as subsequently input variable-values can also be separated from each other by bracketing them. This makes easier reading the variable-values.

(5) Specified editing operation can be made by moving the cursor on the display screen.

What is claimed is:

1. An electronic device having
an input unit for inputting a mathematical expression including a variable,
a memory device for storing a value of the variable, the memory device including a first buffer for storing the mathematical expression, and a second buffer for expanding the stored mathematical expression into a character string to be displayed, and
a display unit for displaying the mathematical expression on a display screen, comprising:
a conversion unit for reading a value of a variable contained in the mathematical expression from the memory device and substituting the read-out value for the variable in the mathematical expression to be displayed on the display screen; and a change-over key for selecting between a first mode of displaying a mathematical expression on the display screen by the display unit after substituting the read-out value for the variable by the conversion unit and a second mode of displaying the mathematical expression on the display screen by the display unit with the variable displayed in terms of a variable-name, thereby allowing a user to change the mode of displaying the mathematical expression on the display screen by successively actuating the change-over key.

2. A method of displaying a mathematical expression including a variable, used with an electronic device having an input unit for inputting a mathematical expression including a variable, a memory device for storing a value of the variable, the memory device including a first buffer for storing the mathematical expression and a second buffer for expanding the stored mathematical expression into a character string to be displayed, and a display unit for displaying the mathematical expression on a display screen, the method comprising the steps of:

reading the value of the variable from the memory device;

substituting the variable in the mathematical expression to be displayed on the display screen with the value of the variable read from the memory device;

storing the mathematical expression in the memory device; and selecting between a first mode of displaying the mathematical expression stored in the memory device on the display screen by the display unit after substituting the read-out value for the variable and a second mode of displaying the mathematical expression on the display screen by the display unit with the variable displayed in terms of a variable-name, using a change-over key included in the electronic device, thereby allowing a user to change the mode of displaying the mathematical expression on the display screen by successively actuating the change-over key.

3. The method of displaying a mathematical expression including a variable as defined in claim 2, wherein the step of substituting includes inserting a beginning mark and an end mark respectively before and after the variable-value in the mathematical expression.

4. The method of displaying a mathematical expression including a variable as defined in claim 2 or 3, wherein a pointer is provided for indicating a position in the first or second buffer, a cursor is displayed on the display screen at the position indicated by the pointer, the position indicated by the pointer is moved by using a cursor moving key and the mathematical expression is edited on the display screen by using the input unit.

\* \* \* \* \*